(12) United States Patent
Matsumoto

(10) Patent No.: US 10,929,657 B2
(45) Date of Patent: Feb. 23, 2021

(54) APPARATUS, METHOD, AND STORAGE MEDIUM FOR SETTING INFORMATION RELATED TO SCANNED IMAGE

(71) Applicant: CANON KABUSHIKI KAISHA, Tokyo (JP)

(72) Inventor: Yoshitaka Matsumoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 81 days.

(21) Appl. No.: 16/248,617

(22) Filed: Jan. 15, 2019

(65) Prior Publication Data
US 2019/0228220 A1     Jul. 25, 2019

(30) Foreign Application Priority Data

Jan. 23, 2018 (JP) .............................. JP2018-009017

(51) Int. Cl.
G06K 9/00 (2006.01)
G06K 9/20 (2006.01)
H04N 1/00 (2006.01)

(52) U.S. Cl.
CPC ..... *G06K 9/00449* (2013.01); *G06K 9/00463* (2013.01); *G06K 9/00483* (2013.01); *G06K 9/2054* (2013.01); *H04N 1/00331* (2013.01); *G06K 2209/01* (2013.01); *H04N 2201/0094* (2013.01)

(58) Field of Classification Search
CPC .......... G06K 9/00449; G06K 9/00463; G06K 9/00483; G06K 9/2054; G06K 2209/01; H04N 1/00331; H04N 2201/0094
See application file for complete search history.

(56) References Cited

U.S. PATENT DOCUMENTS

| | | | | |
|---|---|---|---|---|
| 2015/0302277 | A1* | 10/2015 | Suzuki ................. | G06K 9/2081 382/229 |
| 2019/0102385 | A1* | 4/2019 | Tokita ................... | G06F 16/164 |
| 2019/0230232 | A1* | 7/2019 | Soga .................... | H04N 1/0044 |

FOREIGN PATENT DOCUMENTS

JP     S62-051866     3/1987

* cited by examiner

*Primary Examiner* — Khai M Nguyen
(74) *Attorney, Agent, or Firm* — Venable LLP

(57) ABSTRACT

An apparatus of the invention determines whether or not new scanned image data is similar to past scanned image data based on character string areas and a table area extracted from the new scanned image data, specifies a character string area used to obtain information set to the past scanned image data determined to be similar, detects a target area as a processing target out of the character string areas extracted from the new scanned image data based on the specified character string area, the table included in the past scanned image data determined to be similar, and the table included in the new scanned image data, performs character recognition processing on the detected target area, and sets information to the new scanned image data by using a character obtained as a result of the character recognition processing.

17 Claims, 23 Drawing Sheets

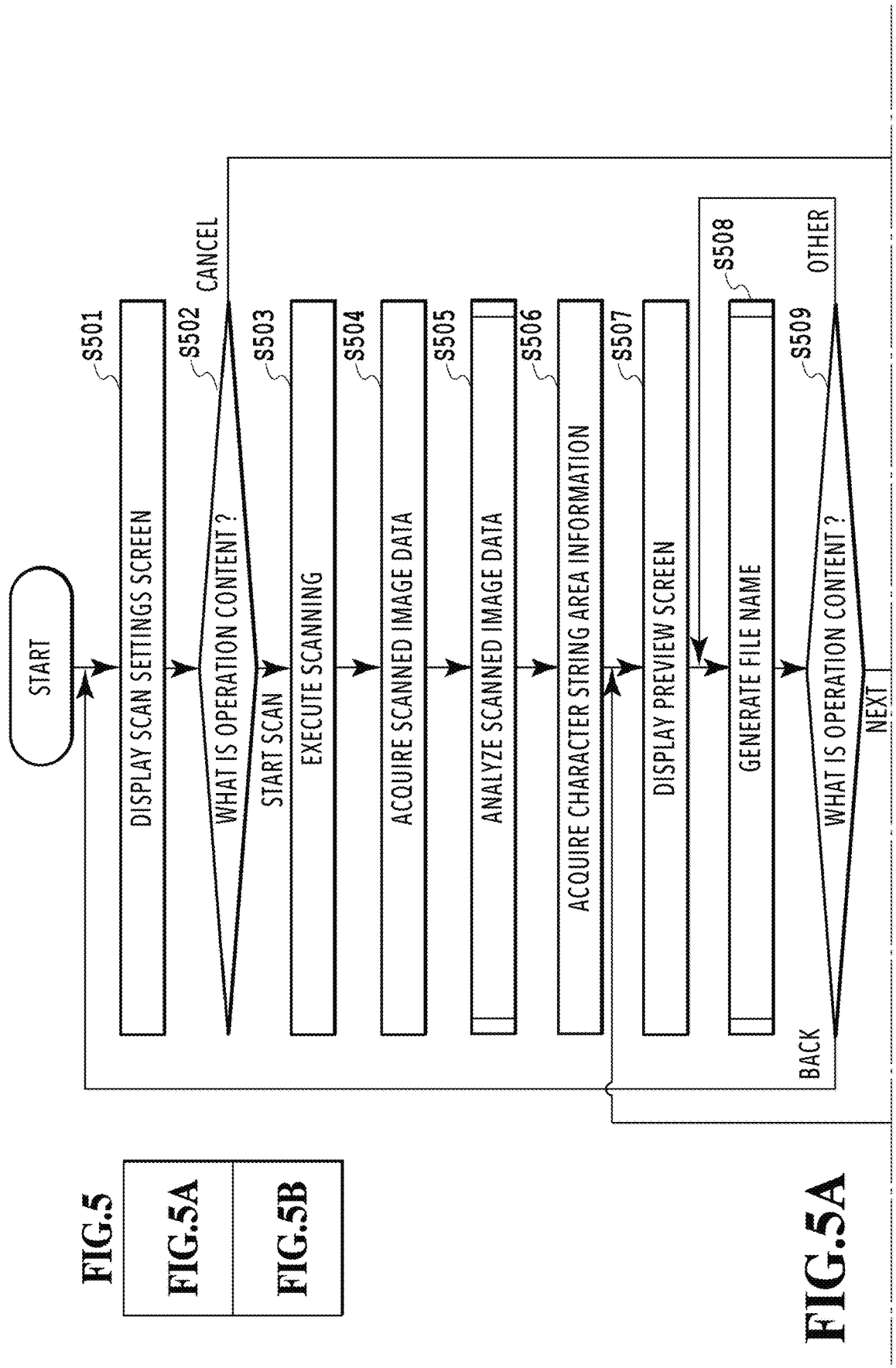

Quotation 100-9999

1-1-1 Minato-ku, Tokyo

Shinagawa Inc.

Ref. No.:

R12-3456

Date of issue:

2017/09/10

| Item | Unit price | Quantity | Amount |
|---|---|---|---|
| GF-1544 | 11,550 | 3 | 34,650 |
| EF24-70 | 134,100 | 1 | 134,100 |
|  |  | Total | 168,750 |

200-1111

2-2-2 Yokohama-shi, Kanagawa

Kawasaki Inc.

PreviewScreen — 800

Quotation_R12_3456_Kawasaki Inc. — 801

▶ — 802
⚙ — 803

810
← 811
821 R12-3456
+ 813
820 Ref. No.:
814 —
822 Date of issue:
823 2017/09/10
→ 812

815 Quotation 816 100-9999
817 1-1-1 Minato-ku, Tokyo
818 Shinagawa Inc.

824 
| Item | Unit price | Quantity | Amount |

830 Back
831 Next

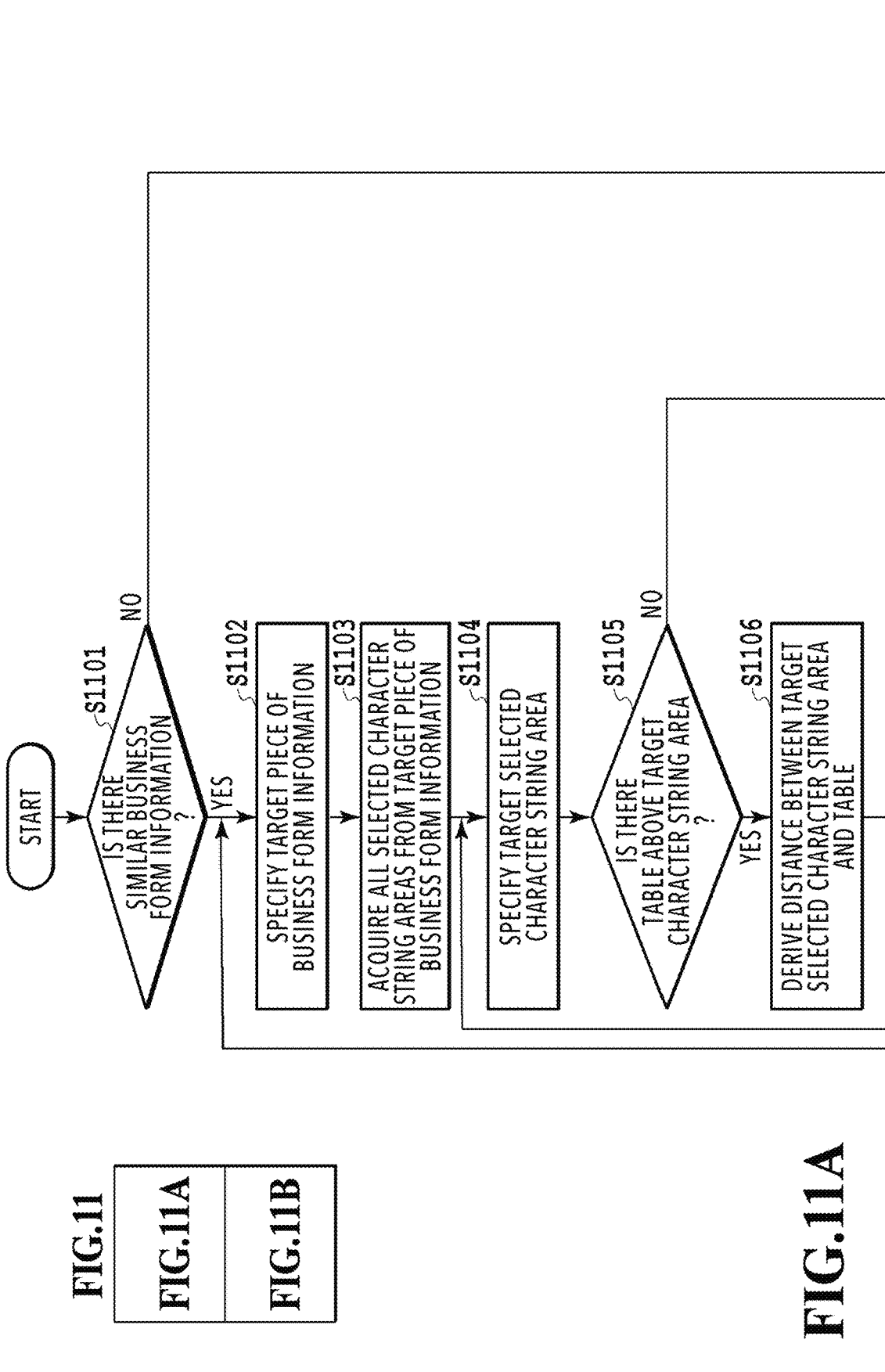

Quotation 100-9999

1-1-1 Minato-ku, Tokyo

Shinagawa Inc.

Ref. No.:
R12-3460

Date of issue:
2017/10/19

| Item | Unit price | Quantity | Amount |
|------|-----------|----------|--------|
| GF-1544 | 11,550 | 3 | 34,650 |
| EF24-70 | 134,100 | 1 | 134,100 |
| CC-55 | 12,000 | 1 | 12,000 |
| | | Total | 180,750 |

200-1111

2-2-2 Yokohama-shi, Kanagawa

Kawasaki Inc.

FIG.12A

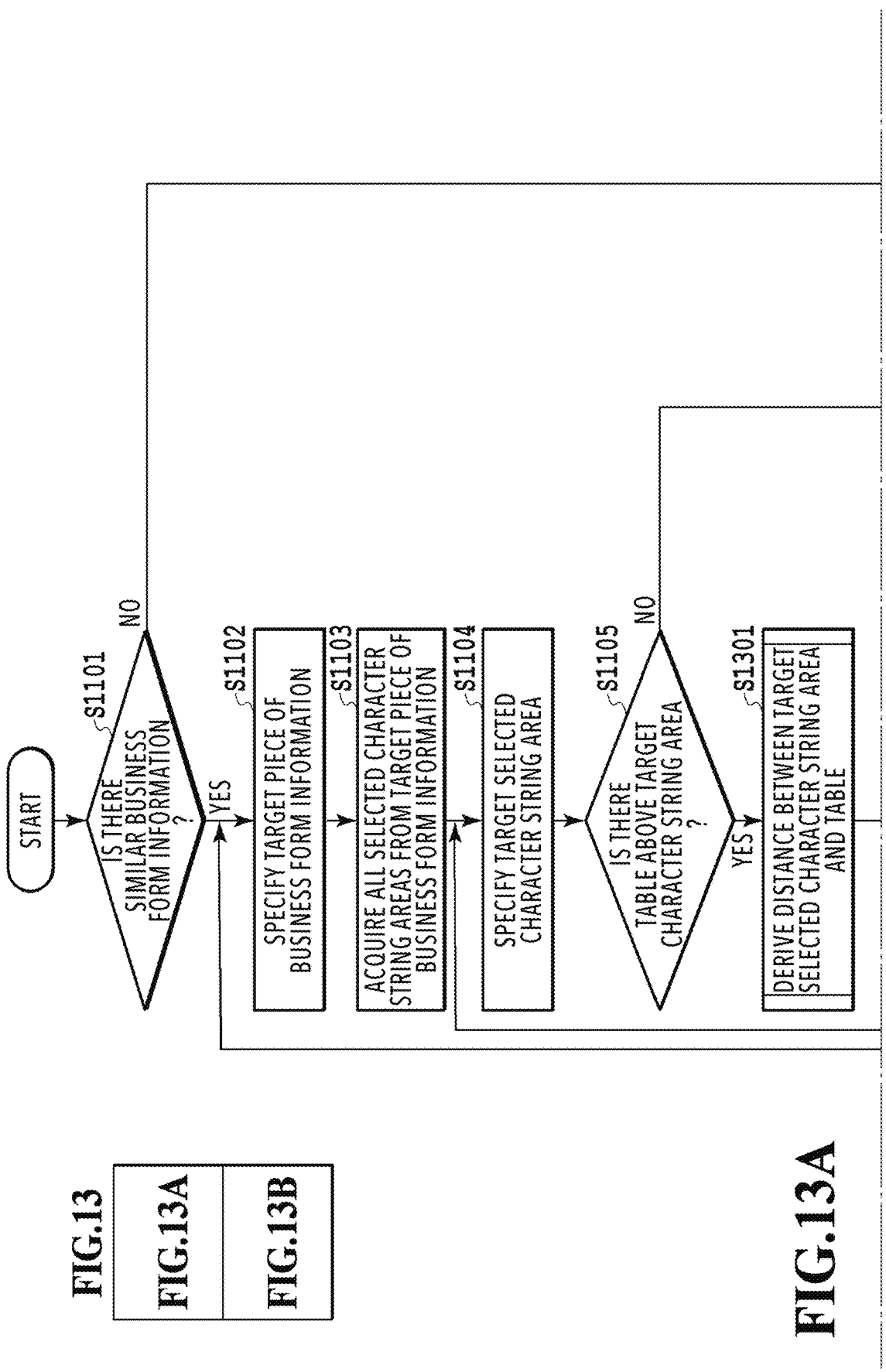

Quotation 100-9999

1-1-1 Minato-ku, Tokyo

Shinagawa Inc.

Ref. No.:
R12-3460

Date of issue:
2017/10/19

| Item | Unit price | Quantity | Amount |
|---|---|---|---|
| GF-1544 | 11,550 | 3 | 34,650 |
| EF24-70 | 134,100 | 1 | 134,100 |
| CC-55 | 12,000 | 1 | 12,000 |
| | | Total | 180,750 |

200-1111

2-2-2 Yokohama-shi, Kanagawa

Kawasaki Inc.

FIG.15A

ID apparatus, method, and storage medium for setting information related to scanned image

BACKGROUND OF THE INVENTION

Field of the Invention

The present invention relates to a technique to set information related to a scanned image obtained by scanning.

Description of the Related Art

There has been a technique designed to perform character recognition processing (hereinafter referred to as OCR processing) on image data (hereinafter referred to as scanned image data) obtained by scanning a paper document, and to use recognized characters as a file name of an electronic file corresponding to the paper document.

Japanese Patent Laid-Open No. S62-051866 (1987) discloses a technique designed to perform the OCR processing on a specific location in scanned image data of a business form and to generate a file while using acquired characters as a file name.

SUMMARY OF THE INVENTION

The present invention provides a technique for appropriately specifying an area to be subjected to the OCR processing in a situation where a file name and the like are set by using a character string obtained by performing the OCR processing on a scanned image.

An apparatus according to an aspect of the present invention is an apparatus configured to set information to scanned image data obtained by scanning a document containing a table. The apparatus includes: an extraction unit that extracts character string areas each estimated as a character string and a table area estimated as a table in new scanned image data, respectively; a determination unit that determines whether or not the new scanned image data is similar to past scanned image data based on the extracted character string areas and the extracted table area; a specification unit that specifies a character string area used to obtain information set to the past scanned image data determined to be similar; a detection unit that detects a target area as a processing target out of the character string areas extracted from the new scanned image data based on the specified character string area, the table included in the past scanned image data determined to be similar, and the table included in the new scanned image data; a recognition unit that performs character recognition processing on the target area; and a setting unit that sets information to the new scanned image data by using a character obtained as a result of the character recognition processing.

Further features of the present invention will become apparent from the following description of exemplary embodiments with reference to the attached drawings.

BRIEF DESCRIPTION OF THE DRAWINGS

FIG. 5 is a diagram showing the relationship of FIG. 5A and FIG. 5B;
FIG. 5A and FIG. 5B are flowcharts showing an overall control flow to a point of saving character string area information;
FIG. 8A to FIG. 8C are diagrams showing an example of a document to be subjected to scan processing and an example of a preview screen;
FIG. 11 is a diagram showing the relationship of FIG. 11A and FIG. 11B;
FIG. 11A and FIG. 11B are flowcharts for deriving character string areas used for a file name;
FIG. 12A and FIG. 12B are diagrams showing another example of the document to be subjected to the scan processing and another example of the preview screen;
FIG. 13 is a diagram showing the relationship of FIG. 13A and FIG. 13B;
FIG. 13A and FIG. 13B are flowcharts for deriving the character string area used for a file name of a second embodiment;
FIG. 15A and FIG. 15B are diagrams showing another example of the document to be subjected to the scan processing and another example of the preview screen.

DESCRIPTION OF THE EMBODIMENTS

Business forms which are paper documents include those adopting a format with a predetermined position of each entry item and a predetermined size of an entry field (an entry area), and those with a position of each entry item not determined in advance, in which an entry field is expandable even in the case of the same format, thereby causing a change in position of the entry item depending on the size of the entry field. For example, a quotation that represents a certain type of business forms may be provided with a table of which an entry area expands downward depending on types of sales items, and an entry item of which an entry position is changed depending on the size of the entry area of the table. According to Japanese Patent Laid-Open No. S62-051866 (1987), a location (an area) to perform the OCR processing is determined in advance. If the OCR processing is performed on a predetermined location of scanned image data of the quotation, in which the position of the entry item is not determined in advance and is made variable depending on the size of the entry field, and if a file is generated by using characters thus obtained as a file name, then the file name is prone to contain unintended characters. In other words, there is a risk of failure to properly specify the area to perform the OCR processing. Here, the risk of failure to properly specify the area to perform the OCR processing may arise not only in the business forms but also in a paper document with a position of the entry item not determined in advance despite of the same format but the position is variable depending on the size of an entry field therein.

Now, modes for carrying out the present invention will be described below with reference to the drawings. It is to be noted that the following embodiments are not intended to limit the invention as defined in the appended claims, and that the solution according to the invention does not always require a combination of all of the features described in the embodiments.

First Embodiment

<Configuration of Image Processing System>

Figure 1:
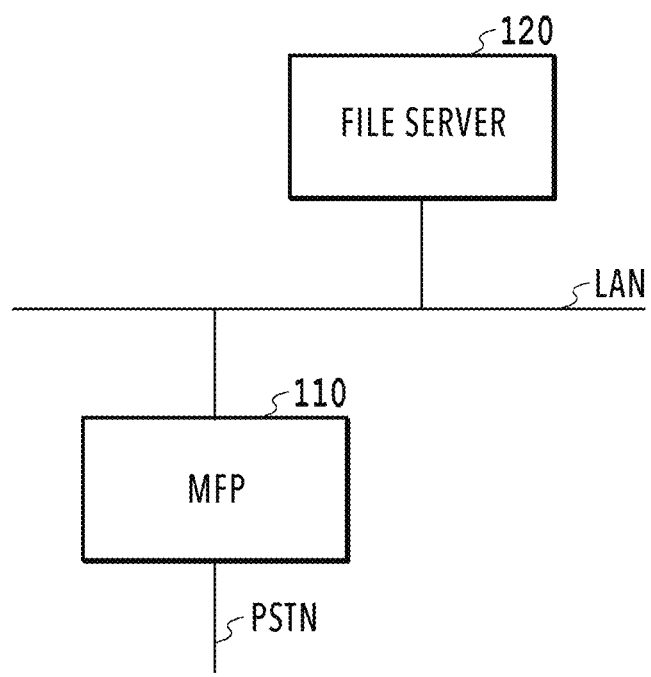
FIG. 1 is a diagram showing an overall configuration of an image processing system.

FIG. 1 is a diagram showing an overall configuration of an image processing system according to this embodiment. The image processing system includes an MFP 110 and a file server 120, which are communicably connected to each other through a LAN (local area network).

The MFP (multifunction printer) 110 is a multifunction machine having multiple functions as a scanner, a printer, and the like, and represents an example of an image processing apparatus. The file server 120 represents an example of an external server which saves and manages computerized document files. Although the image processing system of this embodiment is formed from the MFP 110 and the file server 120, the present invention is not limited only to this configuration. For example, the MFP 110 may combine the function of the file server 120. Meanwhile, the mode of connection may apply the Internet or the like instead of the LAN. Alternatively, the MFP 110 may be connected to the PSTN (public switched telephone network) so that the MFP 110 can perform facsimile communication of image data with a facsimile machine (not shown).

<Hardware Configuration of MFP>

Figure 2:
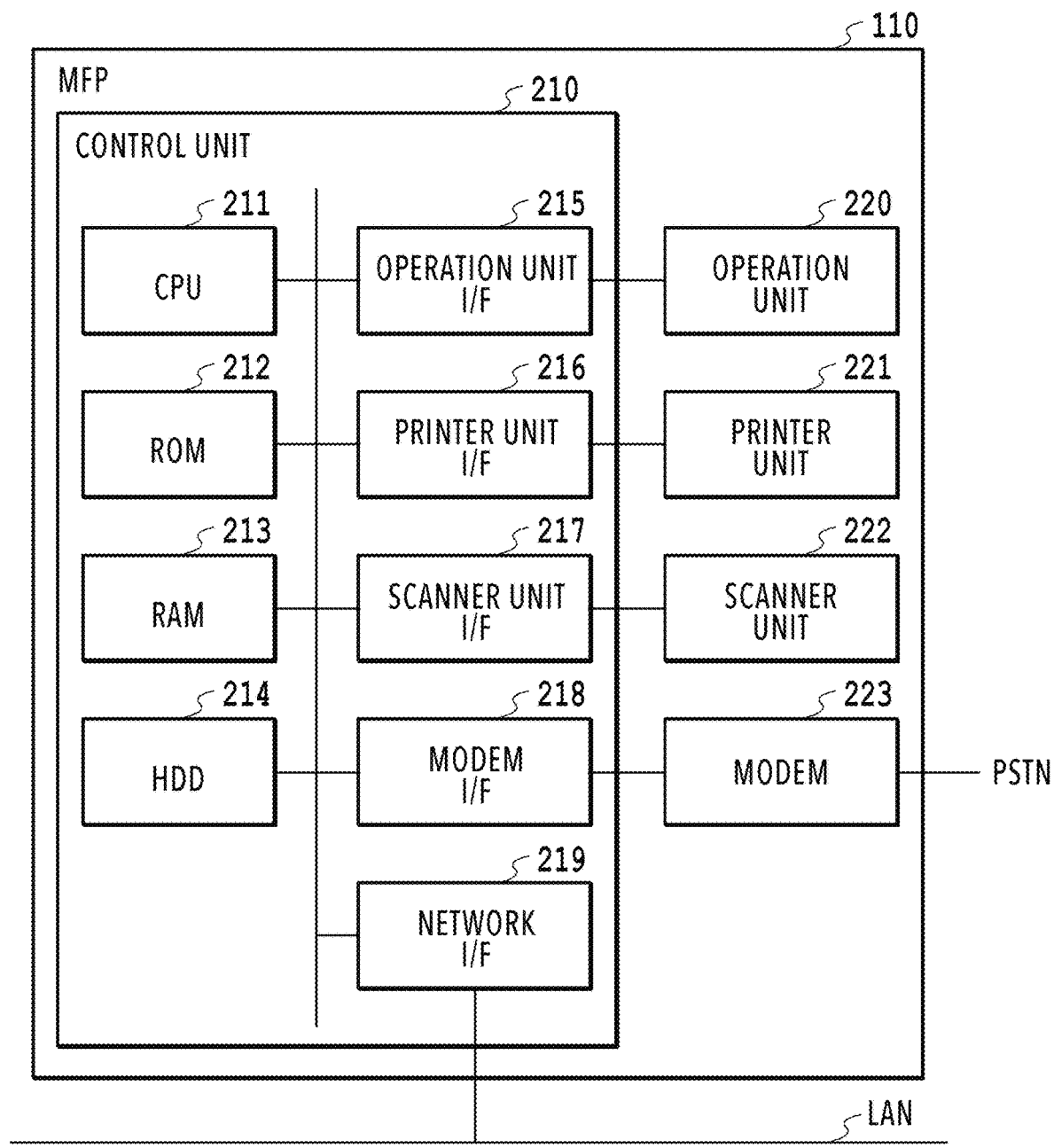
FIG. 2 is a hardware configuration diagram of an MFP.

FIG. 2 is a hardware configuration diagram of the MFP 110. The MFP 110 includes a control unit 210, an operation unit 220, a printer unit 221, a scanner unit 222, and a modem 223. The control unit 210 includes the following subunits 211 to 219 and controls operations of the MFP 110 as a whole. A CPU 211 reads a control program stored in a ROM 212, and executes and controls various functions provided to the MFP 110 including reading, printing, and communicating functions. A RAM 213 is used as a temporary storage area such as a main memory, a work area, and the like for the CPU 211. Here, this embodiment is configured to cause the single CPU 211 to perform the respective processing shown in a flowchart to be described later by using a single memory (either the RAM 213 or an HDD 214). However, other configurations are also applicable. For example, the respective processing may be performed by using multiple CPUs and multiple RAMs or HDDs in cooperation with one another. The HDD 214 is a large-capacity storage unit that stores image data and various programs. An operation unit I/F 215 is an interface which connects the operation unit 220 to the control unit 210. The operation unit 220 is provided with a liquid crystal display unit having a touch-panel function, a keyboard, and the like and plays a role as an acceptance unit to accept operations, inputs, and instructions from a user. The aforementioned operations and the like by the user may be accepted in conjunction with an action of the user to touch the liquid crystal panel or a manipulation of the keyboard, buttons, and the like by the user. A printer unit I/F 216 is an interface which connects the printer unit 221 to the control unit 210. The image data to be printed is transferred from the control unit 210 to the printer unit 221 through the printer unit I/F 216, and is printed on a printing medium. A scanner unit I/F 217 is an interface which connects the scanner unit 222 to the control unit 210. The scanner unit 222 generates image data by reading an original set on a not-illustrated platen or set to an ADF (automatic document feeder), and inputs the image data to the control unit 210 through the scanner unit I/F 217. The MFP 110 is capable of printing out (making a copy of) the image data generated by the scanner unit 222 by using the printer unit 221, and also performing file transmission or mail transmission of the image data. A modem I/F 218 is an interface which connects the modem 223 to the control unit 210. The modem 223 performs facsimile communication of the image data with the facsimile machine on the PSTN. A network I/F 219 is an interface which connects the control unit 210 (the MFP 110) to the LAN. The MFP 110 transmits the image data and other information to external apparatuses (such as the file server 120) on the LAN or receives a variety of information therefrom by using the network I/F 219.

<Hardware Configuration of File Server>

Figure 3:
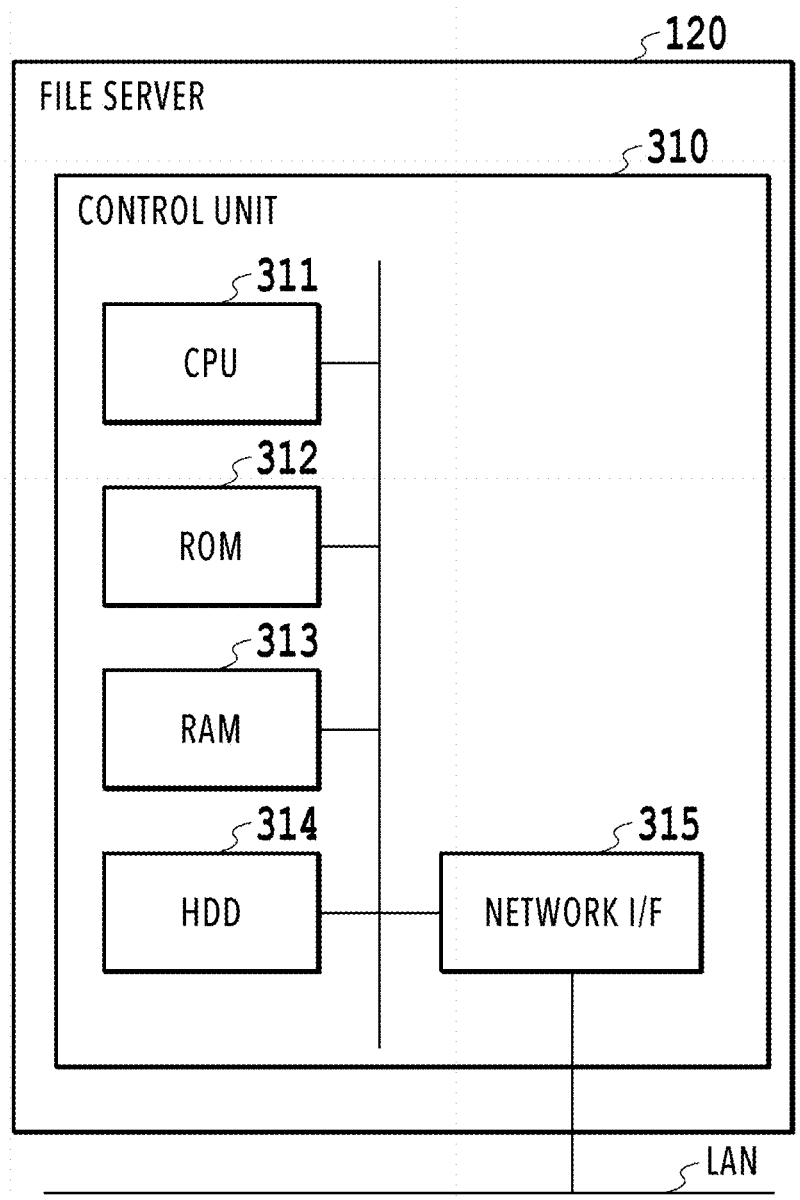
FIG. 3 is a hardware configuration diagram of a file server.

FIG. 3 is a hardware configuration diagram of the file server 120. The file server 120 includes a CPU 311, a ROM 312, a RAM 313, an HDD 314, and a network I/F 315. The CPU 311 reads a control program stored in the ROM 312 and executes a variety of processing, thereby controlling operation of the file server 120 as a whole. The RAM 313 is used as a temporary storage area such as a main memory, a work area, and the like for the CPU 311. The HDD 314 is a large-capacity storage unit that stores image data and various programs. A network I/F 315 is an interface which connects the file server 120 to the LAN. The file server 120 transmits and receives a variety of information to and from the external apparatuses (such as the MFP 110) on the LAN by using the network I/F 315.

<Software Configuration of MFP>

Figure 4:
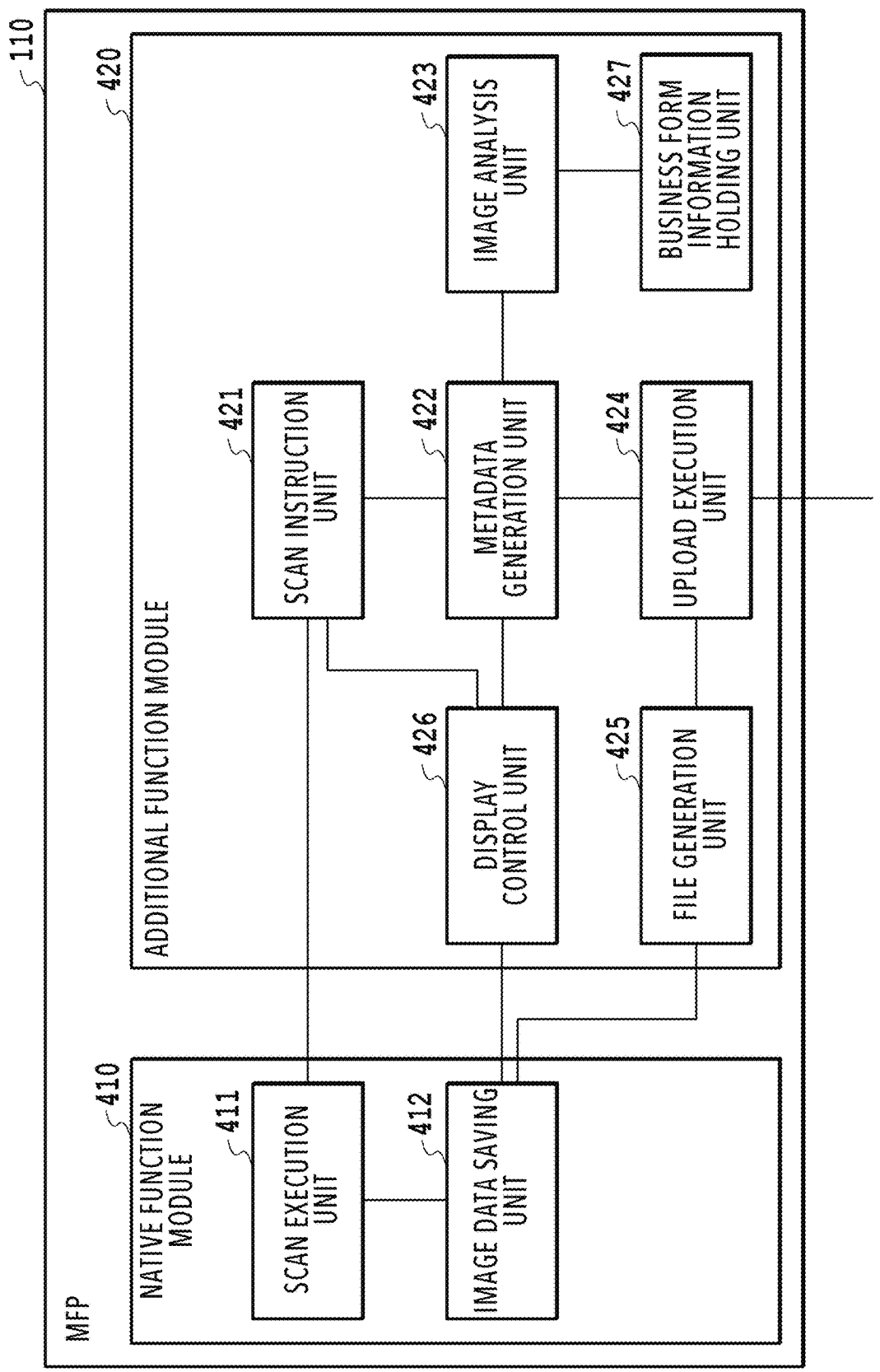
FIG. 4 is a software configuration diagram of the MFP.

FIG. 4 is diagram showing a software configuration of the MFP 110. The MFP 110 includes a native function module 410 and an additional function module 420. Units included in the native function module 410 are provided to the MFP 110 as default. On the other hand, units included in the additional function module 420 are applications that are additionally installed on the MFP 110. The additional function module 420 is formed from the applications based on Java (registered trademark), which can achieve addition of the functions to the MFP 110 easily. Here, other additional function modules (additional applications) not illustrated in FIG. 4 may also be installed on the MFP 110.

The native function module 410 includes a scan execution unit 411 and an image data saving unit 412. The additional function module 420 includes a scan instruction unit 421, a metadata generation unit 422, an image analysis unit 423, an upload execution unit 424, a file generation unit 425, a display control unit 426, and a business form information holding unit 427.

The display control unit 426 displays a UI (user interface) screen on the liquid crystal display unit having the touch-panel function provided to the operation unit 220 of the MFP 110 in order to accept the operations, the inputs, the instructions, and the like from the user. Details of the displayed UI screen will be described later.

In accordance with a user instruction inputted through the display control unit 426, the scan instruction unit 421 sends the scan execution unit 411 a scan processing request together with information on scan settings and on transfer settings included in the user instruction.

The scan execution unit 411 receives the scan request inclusive of the scan settings from the scan instruction unit 421. The scan execution unit 411 generates scanned image data by reading an image on the original with the scanner unit 222 through the scanner unit I/F 217. The scan execution unit 411 transmits the generated scanned image data to the image data saving unit 412. In this instance, the scan execution unit 411 sends the scan instruction unit 421 a scanned image identifier that uniquely identifies the saved scanned image data.

The image data saving unit 412 saves the scanned image data received from the scan execution unit 411 in the HDD 214.

The scan instruction unit 421 acquires the scanned image data from the image data saving unit 412, which corresponds to the scanned image identifier received from the scan execution unit 411. The scan instruction unit 421 requests the metadata generation unit 422 to generate metadata for the acquired scanned image data. The metadata is information concerning the scanned image data such as a file name to be given to the scanned image data. In the following, this embodiment will explain an example in the case where the meta data is the file name.

The metadata generation unit 422 sends the image analysis unit 423 an instruction to analyze the scanned image data. Based on the analysis instruction from the metadata generation unit 422, the image analysis unit 423 performs an image analysis (such as layout analysis processing and the OCR processing (character string recognition processing)). The image analysis unit 423 obtains area information by performing the image analysis of the scanned image data, and sends the metadata generation unit 422 the obtained area information as an analysis result. Table 1 shows an example of the area information. The area information includes information on each area such as a character string area and a table area contained in the scanned image data, which indicates: a number for identifying the area; an x-coordinate, a y-coordinate, a width, and a height of the area; and a type of the area. Here, the character string area is an area where a text is detected as a result of the image analysis, and the table area is an area where a table is detected as a result of the image analysis. Here, methods of detecting texts and tables from image data have been widely known and description thereof will be omitted. In the meantime, for ease of explanation, Table 1 describes only partial areas in the scanned image data.

TABLE 1

| | Area | | | | |
|---|---|---|---|---|---|
| Number | X-coordinate | Y-coordinate | Width | Height | Type |
| 1 | 191 | 24 | 120 | 30 | text |
| 2 | 324 | 74 | 84 | 22 | text |
| 3 | 377 | 99 | 75 | 22 | text |
| 4 | 15 | 104 | 91 | 22 | text |
| 5 | 324 | 128 | 70 | 22 | text |
| 6 | 15 | 130 | 134 | 22 | text |
| 7 | 362 | 155 | 90 | 22 | text |
| 8 | 37 | 166 | 136 | 30 | text |
| 9 | 214 | 174 | 45 | 22 | text |
| 10 | 37 | 190 | 480 | 120 | table |
| 11 | 214 | 311 | 91 | 22 | text |
| 12 | 214 | 335 | 136 | 22 | text |
| 13 | 236 | 359 | 134 | 30 | text |

The image analysis unit 423 compares respective pieces of the area information obtained in the latest image analysis with respective pieces of area information obtained in an earlier (past) image analysis. Here, the respective pieces of the area information obtained in the earlier image analysis are held by the business form information holding unit 427. In the meantime, selection information for specifying a character string area selected as part of a file name by the user in the course of file name generation processing in S508 to be described later is added to each of the relevant pieces of the area information held by the business form information holding unit 427. The area information after the addition of the selection information thereto will be hereinafter referred to as business form information. In a case where the image analysis unit 423 determines as a result of the comparison that the business form information holding unit 427 holds a piece of the area information which is similar to a certain piece of the area information obtained in the latest image analysis, the image analysis unit 423 further determines whether or not the selection information is added to the piece of the area information that is similar (hereinafter referred to as similar area information). In a case where the image analysis unit 423 determines that the selection information is added to the similar area information, the image analysis unit 423 obtains a character string by performing the OCR processing on the area indicated with the selection information, includes the selection information and the obtained character string in the analysis result of the image analysis, and sends the analysis result to the metadata generation unit 422. This will be described later in further detail. Note that the analysis result of the image analysis is also sent to the display control unit 426 through the metadata generation unit 422.

Meanwhile, the metadata generation unit 422 generates the metadata (which is the file name in this embodiment) based on the user instruction inputted through the UI screen and on the analysis result by the image analysis unit 423. The metadata generation unit 422 transmits the scanned image identifier and the generated metadata to the upload execution unit 424. Then, the metadata generation unit 422 instructs the upload execution unit 424 to upload the scanned image data to the file server 120.

Moreover, the metadata generation unit 422 sends a display instruction to the display control unit 426. Based on the display instruction from the metadata generation unit 422, the display control unit 426 displays the UI screen (FIG. 8B, for example) on the liquid crystal display unit with the touch-panel function of the operation unit 220 of the MFP 110. The UI screen is a screen for accepting the operations, the inputs, and the instructions in order to generate the file name. In the meantime, the display control unit 426 displays a preview image of the scanned image data on the UI screen based on the display instruction from the metadata generation unit 422.

The upload execution unit 424 sends the display control unit 426 an instruction to display the UI screen. The display control unit 426 displays a UI screen (FIG. 10, for example) for accepting the operations, the inputs, and the instructions from the user for setting a folder path and for uploading. Details of the UI screen to be displayed in this instance will be described later. Meanwhile, the upload execution unit 424 receives an upload instruction from the user. According to this instruction, the upload execution unit 424 instructs the file generation unit 425 to generate a file of the scanned image data identified by the scanned image identifier.

The file generation unit 425 acquires the scanned image data corresponding to the scanned image identifier in the instruction from the image data saving unit 412, and generates the file to be transmitted to the file server 120.

The upload execution unit 424 establishes connection to the file server 120 by using the set folder path settings and the file name generated by the metadata generation unit 422, and transmits the file generated by the file generation unit 425. In a case where the upload is completed, the upload execution unit 424 notifies the display control unit 426 of completion of the upload. Upon receipt of the notification from the upload execution unit 424, the display control unit 426 updates display contents. The upload execution unit 424 has an SMB (Server Message Block) client function. Accordingly, the upload execution unit 424 uses the SMB to perform file and folder operations involving the file server 120 which has an SMB server function. Besides the SMB, it is possible to use the WebDAV (Distributed Authoring and Versioning protocol for the WWW). Moreover, it is also possible to use the FTP (File Transfer Protocol), the SMTP (Simple Mail Transfer Protocol), and the like. In addition, it is also possible to use the SOAP, the REST (Representational State Transfer), and the like which are not intended for the file transmission.

<Overall Processing Flowchart>

Figure 5B:
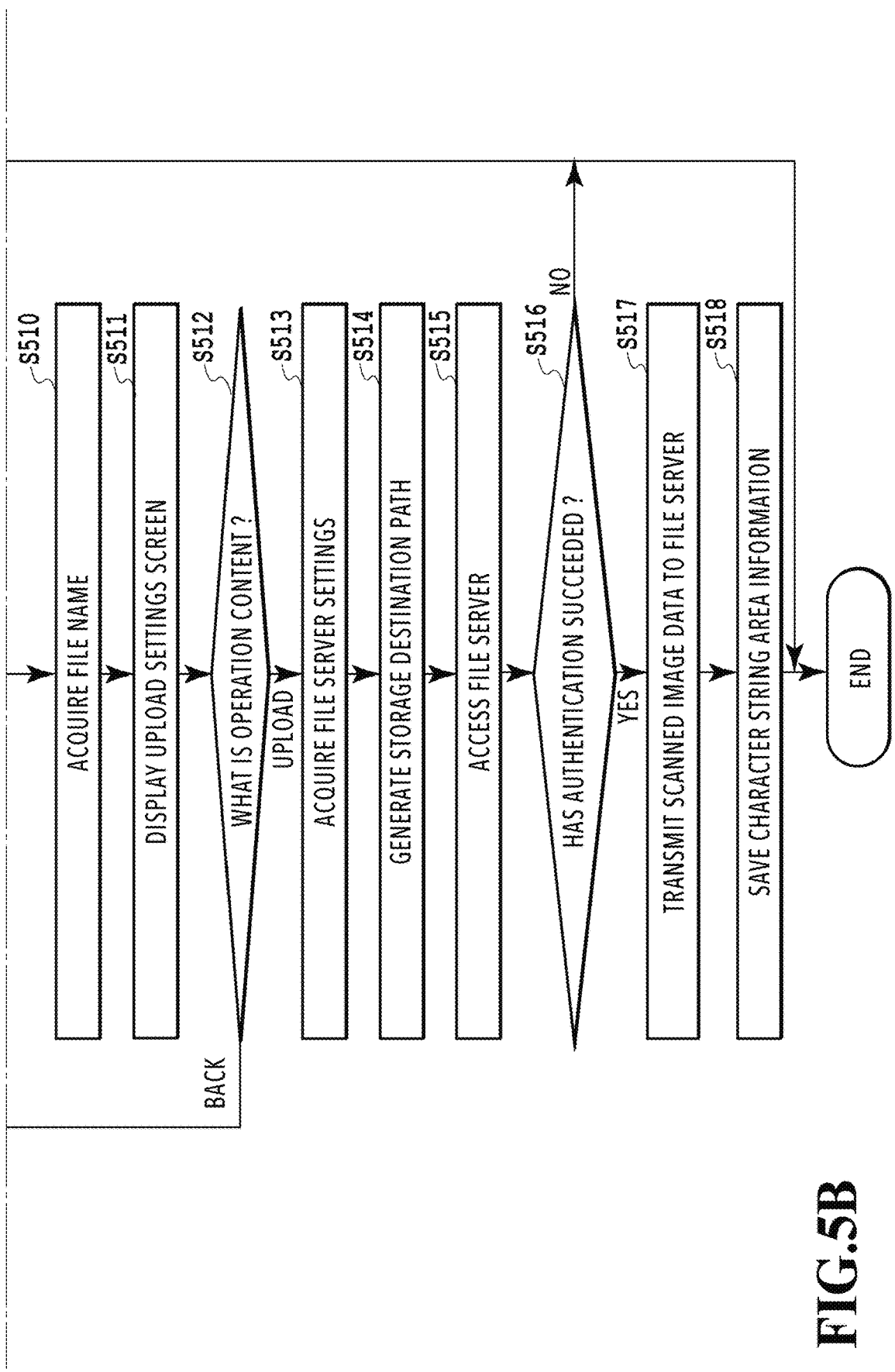

FIG. 5A and FIG. 5B are flowcharts showing an overall control flow to a point of saving character string area information. The series of processing is implemented by causing the CPU 211 of the MFP 110 to execute the control program stored in the HDD 214. Now, details will be described below.

Here, a description will be given of a case of performing the series of processing to the point of saving the character string area information on two similar documents based on the flowcharts of FIG. 5A and FIG. 5B. As for a first round, a description will be given of a case of performing the series of the processing on one of the documents in a state where the business form information holding unit 427 holds no business form information (information on a similar document). In the following description, each numeral with a prefix S indicates the corresponding step in the flowchart.

Subsequently, as for a second round, a description will be given of a case of performing the series of the processing on the other document that is similar to the document to be subjected to the first round of scan processing in a state where the business form information holding unit 427 holds the business form information on the document to be subjected to the first round of the scan processing. Note that this embodiment will explain the case where there is only one table in each document to be subjected to the scan processing. A case where there are two or more tables in a document will be described later in a second embodiment.

The first round will be described to begin with.

In S501, the scan instruction unit 421 instructs the display control unit 426 to display a scan settings screen. The display control unit 426 displays the scan settings screen on the operation unit 220 for enabling various settings in the scan processing.

Figure 6:
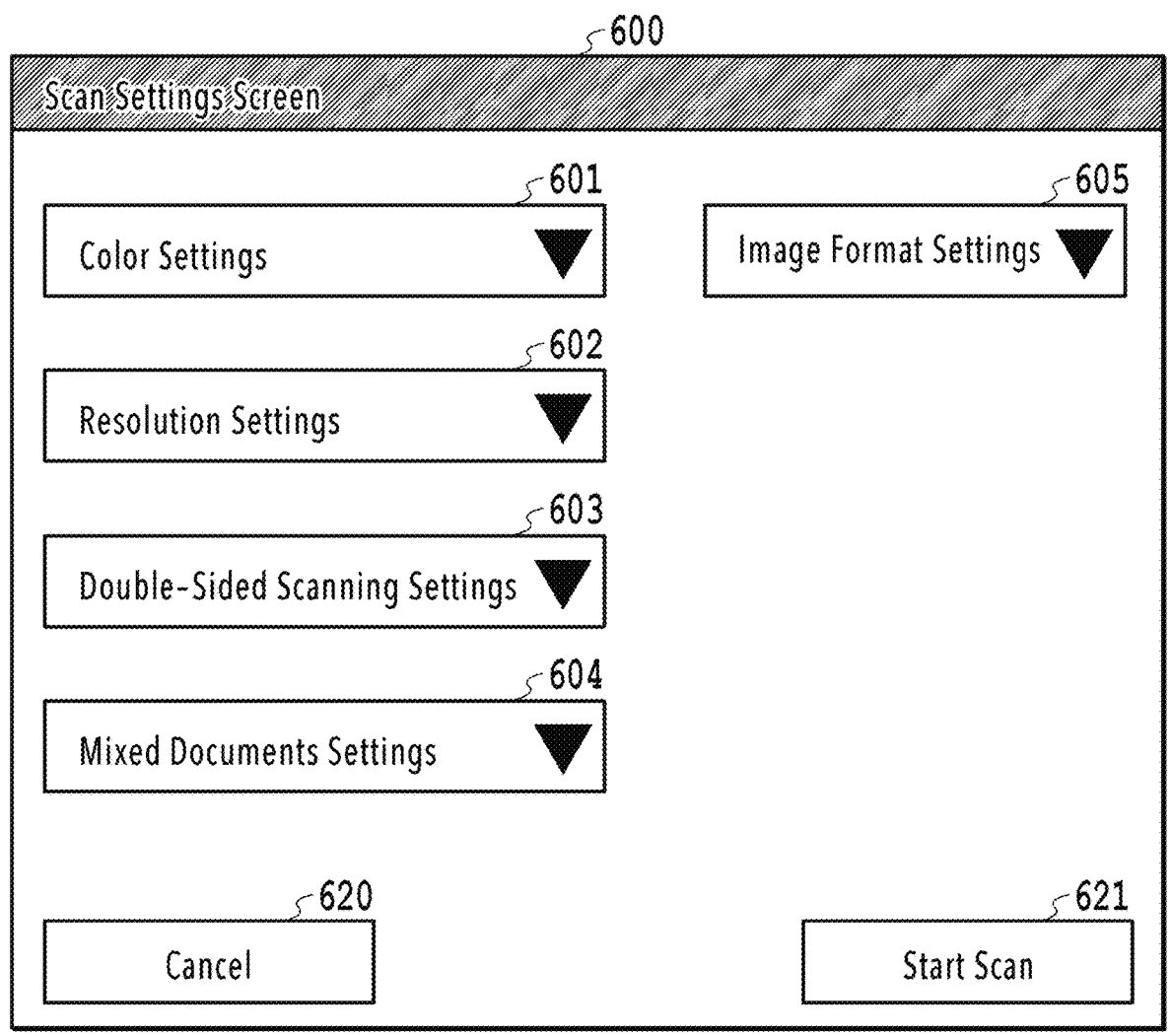
FIG. 6 is a diagram showing an example of a scan settings screen.

FIG. 6 is a diagram showing an example of a scan settings screen 600. There are five settings buttons 601 to 605 on the scan settings screen 600 in FIG. 6. A "Color Settings" button 601 is a button for setting a color mode or a black-and-white mode in a case where scanning an original. A "Resolution Settings" button 602 is a button for setting a resolution in a case where scanning the original. A "Double-Sided Scanning Settings" button 603 is a setting button which is used in a case where the user wishes to scan both sides of the original. A "Mixed Documents Settings" button 604 is a setting button which is used in a case where the user wishes to scan the originals in different sheet sizes at a time. An "Image Format Settings button" 605 is a setting button which is used in a case of designating a saving format of the scanned image data. At the time of setting by using these buttons 601 to 605, candidates (options) that are settable within the range of support by the MFP 110 are displayed and the user selects a desired one of the displayed candidates. Here, the above-mentioned setting buttons are mere examples. In this context, it is not always necessary to provide all of these setting items, or any other setting items may also be present therein. The user performs detailed settings for the scan processing by using the above-described scan settings screen 600. A "Cancel" button 620 is a button which is used in a case of cancelling the scan settings. A "Start Scan" button 621 is a button for instructing a start of the scan processing on the original set on the platen or the like.

In S502, the scan instruction unit 421 determines whether the "Start Scan" button 621 is pressed or the "Cancel" button 620 is pressed. In a case where the scan instruction unit 421 determines that the "Start Scan" button 621 is pressed, the scan instruction unit 421 causes the scan execution unit 411 to perform the scan processing in accordance with the settings of the selected setting items by using the scan settings buttons 601 to 605. The flow is terminated in a case where the scan instruction unit 421 determines that the "Cancel" button 620 is pressed.

In S503, the scan execution unit 411 issues a scan instruction to the scanner unit 222 to scan the original. The scanned image data which is scanned and generated is saved in the image data saving unit 412, and the scan instruction unit 421 is notified of the corresponding scanned image identifier.

In S504, the scan instruction unit 421 acquires the scanned image data corresponding to the scanned image identifier from the image data saving unit 412.

In S505, the metadata generation unit 422 sends the image analysis unit 423 the instruction to analyze the scanned image data acquired from the image data saving unit 412. The image analysis unit 423 analyzes the scanned image data. For example, the image analysis unit 423 analyzes layouts such as character string areas and table areas in the scanned image by extracting a histogram of the scanned image, extracting clusters of pixels, and so forth. The character string areas in the whole scanned image are extracted as a consequence of this analysis. Each character string area is an area (an image area) estimated as a character string. Each table area is an area (an image area) estimated as a table. The character string areas also include an area consisting of one character. Here, the layout analysis processing may include processing to correct a tilt of the scanned image or processing to detect an orientation and to turn the scanned image in order to facilitate the layout operation. Thereafter, characters (text data) included in each character string area (the image area) are extracted by subjecting the character string area to the character recognition processing (the OCR (optical character recognition) processing). The character recognition processing is processing to recognize the characters (the text data) by means of matching processing between a pixel group included in the character string area and a dictionary registered in advance, for example. The character recognition processing may require time for conducting the processing. For this reason, this embodiment intends to accelerate the processing by performing the character recognition processing on the character string areas that are desired by the user instead of performing the character recognition processing one after another on the character string areas extracted by the layout analysis. Information on the character string areas (hereinafter referred to as character string area information) analyzed by the image analysis unit 423 is delivered to the metadata generation unit 422.

Figure 7:
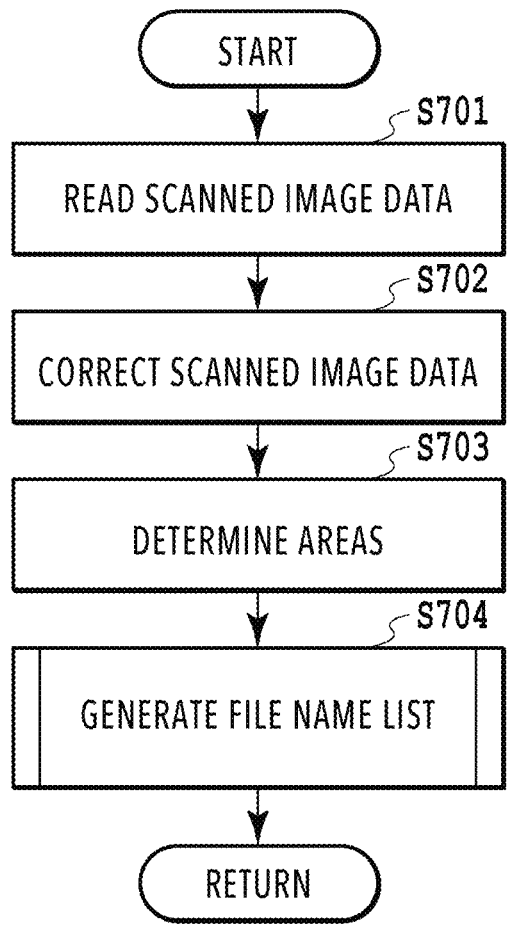
FIG. 7 is a flowchart showing a flow of image processing.

Now, details of the image analysis processing in S505 will be described with reference to FIG. 7. FIG. 7 is a flowchart showing the details of the image analysis processing (S505) by the image analysis unit 423. A description will be given below in accordance with a flow in FIG. 7.

In S701, the image analysis unit 423 reads the scanned image data received from the file generation unit 425 while transforming the scanned image data into an analyzable form.

In S702, the image analysis unit 423 corrects the scanned image data thus read into such a condition more adaptable to area determination and character string analyses to follow. Specifically, the image analysis unit 423 corrects the scanned image data into a condition more adaptable to the analysis processing by correcting a tilt of the original caused due to binarization of an image signal or displacement in the course of the scanning, by turning the original to an upright orientation, and so forth.

In S703, the image analysis unit 423 analyzes contents of the scanned image data corrected in S702, thereby determining the character string areas and the table areas. For example, the image analysis unit 423 subjects the corrected scanned image (a binary image) to edge extraction and the like, thereby determining the character string areas and the table areas in the image. In other words, the image analysis unit 423 specifies each cluster (a unit area) estimated as a serial character string and each cluster (a unit area) estimated as a table. Coordinates, a size in a width direction (a horizontal direction), and a size in a height direction (a vertical direction) are specified for each of the character string areas and the table areas. The width direction (the horizontal direction) of the character string area represents such a direction along a direction of a sentence in a document. The height direction (the vertical direction) of the character string area represents a direction that crosses the direction along the direction of the sentence in the document, such as a direction orthogonal thereto. In the meantime, the image analysis unit 423 specifies whether the direction of the sentence in the document is horizontal writing or vertical writing. In this specification process, it is possible to employ a method of obtaining vertical and horizontal projections of the scanned image (the binary image) and determining one of the directions having a smaller variance of the projection as a row direction. The following Table 2 shows an example of a result of performing the image analysis processing on part of the scanned image of a certain quotation.

In S704, the image analysis unit 423 generates file names in advance while acquiring similar business form information from the business form information holding unit 427 based on the character string areas and the table areas determined in S703.

Now, details of file name list generation processing in S704 will be described with reference to FIG. 11. FIG. 11A and FIG. 11B are flowcharts showing details of the file name list generation processing (S704) by the image analysis unit 423.

In S1101, the image analysis unit 423 determines whether or not the character string areas acquired in S703 are similar to a certain piece of the business form information held by the business form information holding unit 427. In a case where the character string areas of the scanned image data overlap the piece of business form information held by the business form information holding unit 427 by a predetermined rate or more, the image analysis unit 423 determines that the character string areas are similar to the piece of business form information held by the business form information holding unit 427 and that there is the similar business form information. Hence, the flow proceeds to S1102. On the other hand, in a case where the character string areas of the scanned image data overlap pieces of business form information held by the business form information holding unit 427 by a rate less than the predetermined rate, the image analysis unit 423 determines that there is no similar business form information and therefore terminates the flow. Note that this similarity determination is performed in S1101 on every piece of the business form information held by the business form information holding unit 427. The predetermined rate serving as a criterion of the similarity determination is a numerical value that is settable and changeable by the user. It is also possible to adopt weighting depending on the area regarding the similarity determination. In the first round, the file name list generation processing is terminated at this point since the business form information holding unit 427 holds none of the business form information. Accordingly, the processing from S1102 on will be explained in conjunction with a description of a second round.

Table 2 shows an example of the character string area information analyzed in the layout analysis processing.

TABLE 2

| Number | Area | | | | | Character string in area (for reference) |
|---|---|---|---|---|---|---|
| | X-coordinate | Y-coordinate | Width | Height | Type | |
| 1 | 191 | 24 | 120 | 30 | text | QUOTATION |
| 2 | 324 | 74 | 84 | 22 | text | Ref. No. |
| 3 | 377 | 99 | 75 | 22 | text | R12-3456 |
| 4 | 15 | 104 | 91 | 22 | text | 100-9999 |
| 5 | 324 | 128 | 70 | 22 | text | Date of issue: |
| 6 | 15 | 130 | 134 | 22 | text | 1-1-1 Minato-ku, Tokyo |
| 7 | 362 | 155 | 90 | 22 | text | 2017 Aug. 15 |
| 8 | 37 | 166 | 136 | 30 | text | Shinagawa Inc. |
| 9 | 37 | 190 | 480 | 120 | table | |
| 10 | 214 | 311 | 91 | 22 | text | 200-1111 |
| 11 | 214 | 335 | 136 | 22 | text | 2-2-2 Yokohama-shi, Kanagawa |
| 12 | 236 | 359 | 134 | 30 | text | Kawasaki Inc. |

In Table 2 shown above, an item "Number" is a number that uniquely indicates each of the specified character string areas. In this example, serial numbers 1 to 12 are allocated in the order of recognition. As for coordinates, an upper left corner of a preview display area 810 to be described later in detail is defined as a point of origin (0, 0) and an x-axis is defined to extend rightward while a y-axis is defined to extend downward. A subitem "X-coordinate" in the item "Area" indicates an x-coordinate at an upper left corner of each specified character string area. A subitem "Y-coordinate" in the item "Area" indicates a y-coordinate at the upper left corner of each specified character string area. Accordingly, the remark "coordinate" in the following description regarding any of the character string areas means a position coordinate at the upper left corner of the character string area unless otherwise specified. A subitem "Width" in the item "Area" indicates a distance from a left side to a right side of each specified character string area. A subitem "Height" in the item "area" indicates a distance from an upper base to a lower base of each specified character string area. In this embodiment, the subitems "X-coordinate", "Y-coordinate", "Width", and "Height" are indicated by using pixels. Instead, these subitems may be indicated by using points, inches, and the like.

Reference is made back to FIG. 5A.

In S506, the metadata generation unit 422 acquires the pieces of the character string area information (image analysis data) which are analyzed and extracted from the scanned image by the image analysis unit 423. Each piece of the character string area information is acquired in a CSV format or an XML format, for example. However, the character string area information may be acquired in a different format. Alternatively, the character string area information may be temporarily saved in the HDD 214 and then acquired at a given timing.

In S507, the metadata generation unit 422 instructs the display control unit 426 to display a preview screen. The display control unit 426 displays the preview screen on the touch panel of the operation unit 220 by using the scanned image data received from the scan instruction unit 421. The user can set the file name of the scanned image data through the preview screen.

Figure 8C:
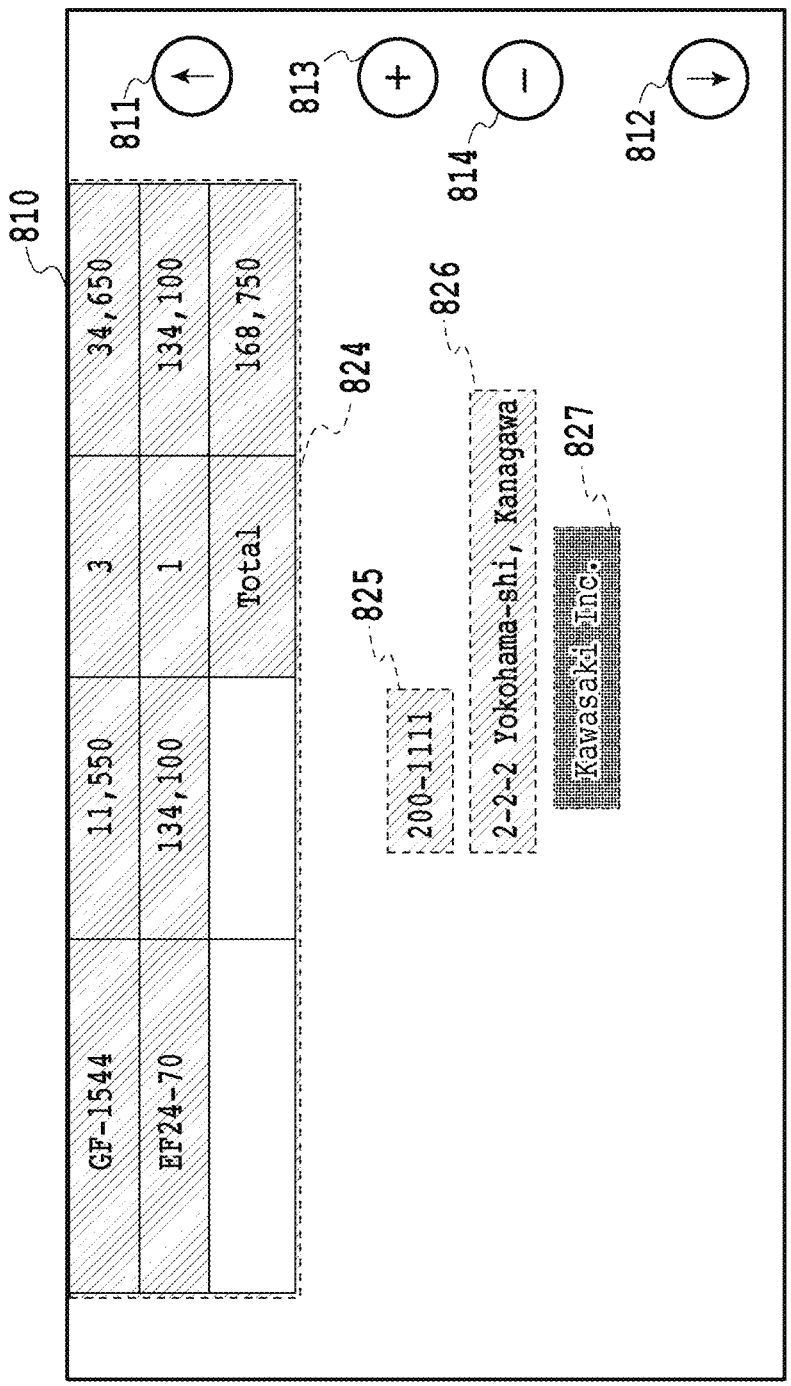

FIG. 8A is a diagram showing an example of a document to be subjected to the scan processing. FIG. 8B is a diagram showing an example of the preview screen in the case of subjecting the document (the original) shown in FIG. 8A to the scan processing. FIG. 8C is a diagram showing an example in a case of scrolling down the scanned image displayed in the preview display area 810 to be described later. By using buttons 802 and 803, the user performs setting of a file name to be transmitted to the file server 120, which is supposed to be executed by the upload execution unit 424 via a preview screen 800. A "display file name list" button 802 is used to display a file name selection list for setting the file name in a file name input field 801. The file name selection list is displayed in the second round of the processing and so on. The file name selection list is generated in a case where it is determined that the business form information holding unit 427 holds the area information that is similar to the area information obtained in the latest image analysis and in a case where the selection information is added to the similar area information. The file name selection list is formed from file names that are extracted from the area information obtained in the latest image analysis and on the basis of the selection information on the similar area information. Specifically, the file name selection list including all file names that possibly become candidates selectable by the user (hereinafter referred to as file name candidates) is displayed in a case where the "display file name list" button 802 is pressed. Table 3 shows an example of the file name selection list. This example shows a case where the pieces of the area information similar to the area information shown in Table 2 and with the selection information added thereto are held by the business form information holding unit 427. The business form information holding unit 427 holds the scanned image data, which have a file name formed from the character strings in the character string areas corresponding to number 1 (QUOTATION) in Table 2, number 3 (R12-3456) in Table 2, and number 12 (Kawasaki Inc.) in Table 2. In addition, the business form information holding unit 427 holds the scanned image data, which has a file name formed from the character strings in the character string areas corresponding to number 1 (QUOTATION) in Table 2, number 3 (R12-3456) in Table 2, and number 8 (Shinagawa Inc.) in Table 2. In this state, the file name list generation processing is performed on the scanned image data containing the character string area information shown in Table 2. In this way, the file name selection list including a file name candidate "QUOTATION_R12-3456_Kawasaki Inc." and a file name candidate "QUOTATION_R12-3456_Shinagawa Inc." is generated.

TABLE 3

| Number | Name to display |
|---|---|
| 1 | Quotation_R12-3456_Kawasaki Inc. |
| 2 | Quotation_R12-3456_Shinagawa Inc. |

Each file name candidate is composed of a format that combines the items constituting the file name with at least one delimiter between the items. The items constituting the file name also relate to the contents of the OCR processing to be described later.

The button 803 is a button used for setting a file name format and the like. Note that the types of the various buttons and the aspects of display and selection of the character string areas mentioned above are merely exemplary and the present invention is not limited only to the foregoing components. For instance, a button for modifying and changing the character string shown in the file name input field 801 or a button for confirming the file name may also be provided.

On the preview screen 800, the scanned image and buttons 811 to 814 for changing a state of display of the scanned image are also displayed in the preview display area 810 located at the center of the screen. The buttons 811 and 812 are buttons that show up in a case where it is not possible to display the entire scanned image, and are used for scrolling the display area in the vertical direction. The touch panel provided to the MFP 110 is not usually so large. Accordingly, in a case where the scanned image is acquired by scanning the original either in A4 portrait size or A4 landscape size, for example, the touch panel is initially set to perform reduced display such that the entire breadth in the width direction (a lateral direction) of the scanned image fits into the preview display area 810 while aligning the top base of the scanned image with an upper end of the preview display area 810. In other words, in the initial setting, a lower part of the A4 portrait scanned image is not displayed in the preview display area 810. In this case, it is possible to scroll down the display area so as to display the lower part by pressing the "↓" button 812. On the other hand, it is possible to scroll up the display area so as to display the upper part again by pressing the "↑" button 811.

Furthermore, if the scanned image has A4 landscape size or A3 size, for instance, then buttons for scrolling the display area sideways may be provided in addition. The buttons 813 and 814 are buttons used for enlarging and reducing the display area. The "+" button 813 is pressed to zoom in while the "−" button 814 is pressed to zoom out. The above-described actions by operating the buttons may be realized by operations with fingers of the user on the preview screen such as swiping, pinching out, and pinching in. Meanwhile, in the preview display area 810, the character string areas specified by the image analysis processing in S505 are displayed in such a mode (with enclosures, for example) selectable and recognizable by the user based on the above-described pieces of the character string area information. The user selects a desired character string area (by touching the area with the finger, for example) out of the character string areas displayed in the preview display area 810 in the mode recognizable by the user. As a consequence of this selection operation, the character string included in the selected area is displayed in, or automatically inputted to the file name input field 801 to serve as one of the character strings that constitute the file name. A "Back" button 830 is a button used in the case of cancelling the preview display.

A "Next" button 831 is a button used for moving to a screen for setting an upload destination of the read scanned image data.

File name character string setting areas 815 to 827 are displayed in the preview display area 810 in accordance with the character string area information obtained by the analysis of the scanned image data by the image analysis unit 423. Each piece of the character string area information indicates a position on the scanned image data as shown in Table 2. Accordingly, each piece of the character string area information is displayed at a position after reflecting the scrolling as well as the enlargement or reduction to the scanned image data displayed in the preview display area 810. In a case where the user touches any of the character string areas, the character string located in the character string area touched by the user is inputted to the file name input field 801. Each area indicated with hatched lines represents an area recognized as a character string, which is formed into a rectangular shape. Each shaded area represents an area touched already by the user and selected as part of the file name. As for these setting items using the respective buttons 811 to 814 as well as the respective areas 815 to 827, it is not always necessary to provide all of these setting items, or any other setting items may also be present therein.

In S508, the file generation unit 425 generates the file name corresponding to the scanned image based on the inputted instruction from the user.

Figure 9:
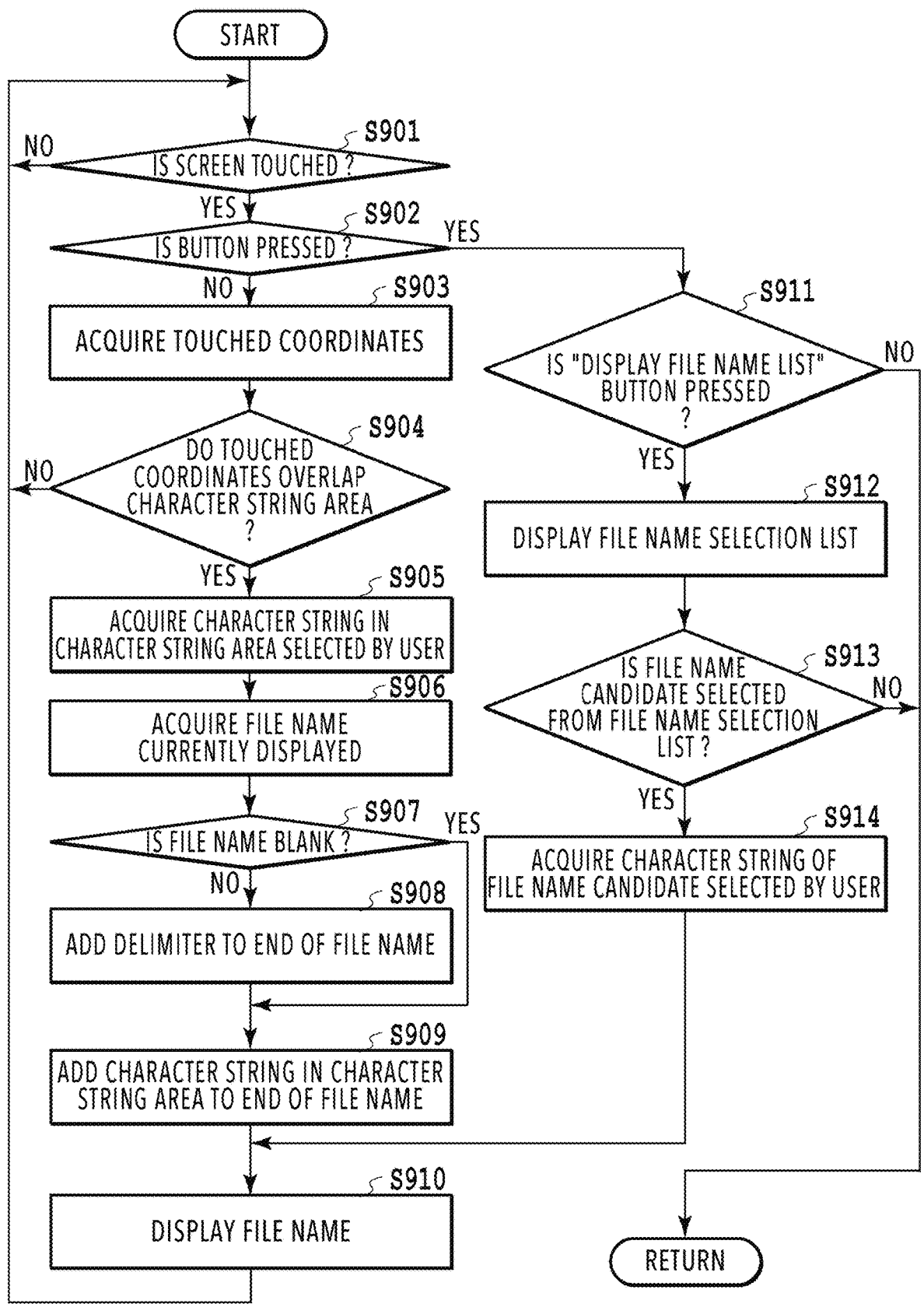
FIG. 9 is a flowchart showing details of file name generation processing.

Here, details of the file name generation processing in S508 will be described with reference to FIG. 9. FIG. 9 is a flowchart showing the details of the file name generation processing (S508). Now, a description will be given below in accordance with a flow in FIG. 9.

In S901, the presence of an operation by the user to touch the preview screen 800 displayed on the touch panel is monitored. The flow proceeds to S902 in a case where the touch operation is detected. In the subsequent S902, the processing to follow is decided depending on the content of the touch operation. The flow proceeds to S911 in a case where the content of the touch operation is detected as press of any of the buttons. In S911, the processing to follow is decided by the type of the pressed button. The flow is terminated in a case where the press of the button other than the "display file name list" button 802 is detected. The flow proceeds to S912 in a case where the press of the "display file name list" button 802 is detected. The processing from S912 on will be explained in conjunction with the description of the second round.

On the other hand, the flow proceeds to S903 in a case where the operation other than the press of any of the buttons is detected.

The position coordinates (x,y) on the touch panel subjected to the touch operation are acquired in S903. In the subsequent S904, it is determined whether or not the position coordinates subjected to the touch operation overlap any of the character string areas displayed in the mode selectable and recognizable by the user. This determination is made, for example, based on whether or not the position coordinates subjected to the touch operation are included in the inside of any of the character string areas displayed in the preview display area 810 in the mode selectable and recognizable by the user (the inside of the rectangle specified by the position coordinates representing four corners of the relevant character string area). The flow proceeds to S905 in a case where the position coordinates subjected to the touch operation overlap any of the character string areas displayed in the mode selectable and recognizable by the user. On the other hand, the flow returns to S901 in a case where the position coordinates do note overlap any of the above-mentioned character string areas.

The character string located in the character string area overlapping the position coordinates subjected to the touch operation is acquired in S905. As for the acquisition of the character string, the character string is acquired by causing the image analysis unit 423 to perform the OCR processing on the character string area selected by the touch operation (hereinafter referred to as a selected character string area), and thus extracting the character string. Then, the file name currently displayed in the file name input field 801 is acquired in S906. Subsequently, it is determined whether or not the body of the acquired file name is "blank" in S907. Here, the file name that is "blank" means a blank state where no character strings are displayed in the file name input field 801. The flow proceeds to S909 in a case where the acquired file name is "blank". On the other hand, the flow proceeds to S908 in a case where the acquired file name is not "blank".

Processing to add a predetermined delimiter to the end of the file name acquired in S906 is performed in S908. Here, an example of using an underscore as the predetermined delimiter will be described herein. However, the present invention is not limited to this configuration. For example, a symbol or a character other than the underscore, such as a hyphen, may be used as the delimiter. Alternatively, the delimiter may be an unsubstantial thing like a space.

In S909, the character string acquired in S905 (the character string extracted from the selected character string area) is set as a constituent of the file name. In this case, if there is a character string set in advance, then the subsequent character string is added to the end of the existing character string. Thereafter, the character string set at this moment is displayed in (automatically inputted to) the file name input field 801 in S910. While the user continues the touch operation of the character string areas displayed on the preview screen, the above-described processing from S901 to S910 is repeatedly performed.

The contents of the file name generation processing have been described. According to the above-described processing, the file name of the scanned image is generated by inserting the delimiter into every space between the character string areas selected by the user.

FIG. 8B shows the preview screen 800 in the state after generation of the file name in S508. In this example, a character string that reads "QUOTATION_R12-3456_Kawasaki Inc." is displayed (set) in the file name input field 801 as a consequence of sequentially selecting the character string areas corresponding to "QUOTATION", "R12-3456", and "Kawasaki Inc.". In the preview display area 810, the areas 815, 821, and 827 indicating the character strings used in the file name as a consequence of the touch operation by the user are displayed in the rectangular form, respectively. Then, as the user presses the "Next" button 831 after the generation of the desired file name, the flow is terminated via S901, S902, and S911.

Reference is made back to FIG. 5A.

In S509, the metadata generation unit 422 decides the processing to follow depending on the content of the touch operation by the user. In a case where the press of the "Next" button 831 is detected, the information on the file name (the character string set as the file name) displayed in the file name input field 801 is sent to the upload execution unit 424, and then the flow proceeds to S510. In a case where the press of the "Back" button 830 is detected, the flow returns to S501 (display of the scan settings screen). The flow returns to S508 (generation of the file name) in a case where an operation other than the press of the "Next" button 831 or the "Back" button 830 is detected.

In S510, the metadata generation unit 422 acquires the file name set in the file name input field 801. The metadata generation unit 422 delivers the acquired file name as well as the scanned image identifier to the upload execution unit 424.

In S511, the upload execution unit 424 instructs the display control unit 426 to display a UI screen for setting a destination of the scanned image data (hereinafter referred to as an upload settings screen). The display control unit 426 displays the upload settings screen used for carrying out various settings in data transmission processing on the operation unit 220. The user carries out detailed settings concerning the upload to the file server 120 through the upload settings screen.

Figure 10:
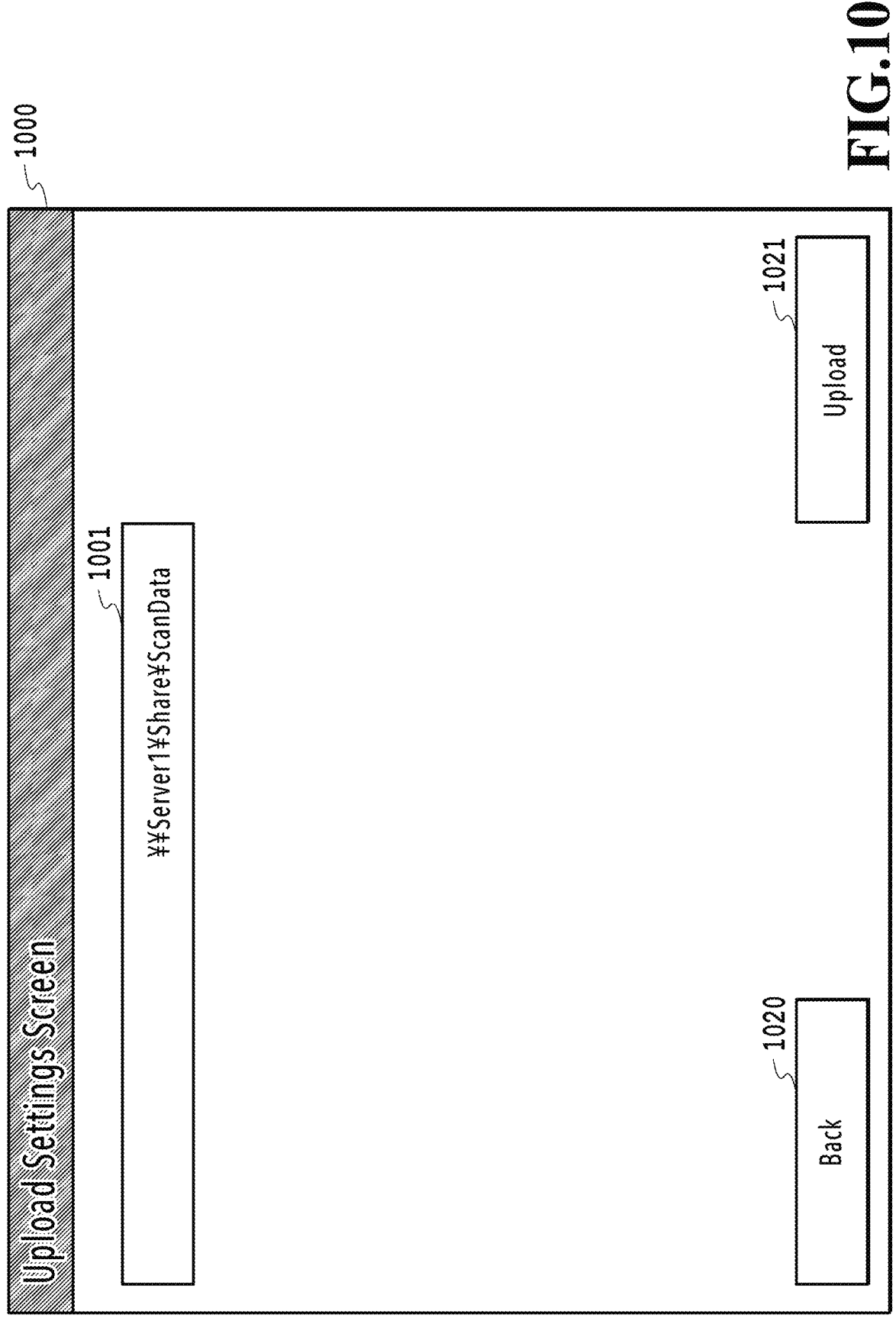
FIG. 10 is a diagram showing an example of an upload settings screen.

FIG. 10 is a diagram showing an example of an upload settings screen 1000. The user inputs a folder path for transmission to the file server 120 into a "folder path" input field 1001. In the example of FIG. 10, "¥¥Server1¥Share¥ScanData" is inputted as the folder path. As for a method of inputting the folder path, a subwindow (not shown) in the form of a keyboard screen may be displayed in response to a tapping action on the "folder path" input field 1001, for example, so as to allow the user to input and set a path name through the keyboard screen. Alternatively, an address book reference screen (not shown) may be displayed so as to allow the user to select and set a certain address from address book data saved in the HDD 214 of the MFP 110. A "Back" button 1020 is a button used in the case of cancelling the detailed settings concerning the upload. An "Upload" button 1021 is a button used for instructing the upload to the folder path set in the "folder path" input field 1001.

In S512, the upload execution unit 424 decides the processing to follow depending on the content of the touch operation by the user as with S509. The flow proceeds to S513 in a case where the press of the "Upload" button 1021 is detected. On the other hand, in a case where the press of the "Back" button 1020 is detected, the flow returns to S507 (display of the preview screen).

In S513, the upload execution unit 424 acquires file server settings and delivers the file server settings, the folder path acquired in S511, and the file name acquired in S510 to the metadata generation unit 422. In this case, the path name inputted to the "folder path" input field 1001, the file name generated in S508, and the file server settings constitute information necessary for storing the scanned image data in the file server 120. For example, this information includes a host name, a starting point of the folder path, a log-in user name, a password, and so forth.

In S514, the metadata generation unit 422 generates a storage destination path of the scanned image data based on the information received from the upload execution unit 424. For example, the storage destination path is generated by adding the folder path to the file server settings (the host name of the file server 120 and the starting point of the folder path). As a consequence, the storage destination path such as "¥¥Server01¥Share¥ScanData" is generated, for instance.

In S515, the upload execution unit 424 executes access to the file server 120. In this case, the upload execution unit 424 sends the file server 120 the user name and the password included in the file server settings. Upon receipt of the user name and the password, the file server 120 executes authentication processing.

In S516, the upload execution unit 424 decides the processing to follow depending on a result of authentication by the file server 120. Specifically, the flow proceeds to S517 in a case where a notice of a success in authentication is received from the file server 120. On the other hand, this processing is terminated in a case where a notice of a failure in authentication is received therefrom.

In S517, the scanned image data is transmitted from the upload execution unit 424 to the folder designated by the storage destination path generated in S514, and is stored in the file server 120.

In S518, the image analysis unit 423 causes the business form information holding unit 427 to hold the character string area information acquired in S506 and the character string area information (the selection information) selected and acquired in S508.

Table 4 shows an example of the character string area information to be held as well as the selected character string area information.

TABLE 4

| Business form number | Number | X-coordinate | Y-coordinate | Width | Height | Type | Selection information | Character string in area (for reference) |
|---|---|---|---|---|---|---|---|---|
| 1 | 1 | 191 | 24 | 120 | 30 | text | 1 | QUOTATION |
|  | 2 | 324 | 74 | 84 | 22 | text | — | Ref. No. |
|  | 3 | 377 | 99 | 75 | 22 | text | 2 | R12-3456 |
|  | 4 | 15 | 104 | 91 | 22 | text | — | 100-9999 |
|  | 5 | 324 | 128 | 70 | 22 | text | — | Date of issue: |
|  | 6 | 15 | 130 | 211 | 22 | text | — | 1-1-1 Minato-ku, Tokyo |
|  | 7 | 362 | 155 | 90 | 22 | text | — | 2017 Aug. 15 |
|  | 8 | 37 | 166 | 136 | 30 | text | — | Shinagawa Inc. |
|  | 9 | 37 | 190 | 480 | 120 | table | — |  |
|  | 10 | 214 | 311 | 91 | 22 | text | — | 200-1111 |
|  | 11 | 214 | 335 | 136 | 22 | text | — | 2-2-2 Yokohama-shi, Kanagawa |
|  | 12 | 236 | 359 | 134 | 30 | text | 3 | Kawasaki Inc. |

A business form number is a number to be uniquely allocated to every piece of the business form information to be held by the business form information holding unit 427. Here, the business form number is 1 because the business forms is of a first type. Moreover, the business form information holding unit 427 holds the selection information. Numbers of the selection information indicate the order of the character string areas selected by the user in the processing in S508.

The contents of the overall control to the point of saving the character string area information have been described. Note that this embodiment assumes to perform the processing from S503 to S508 on the scanned image data for one page generated by execution of the scan processing. For example, a button used for performing the image analysis of the next page may be provided in the preview display area 810 so as to enable settings of character strings to constitute the file name by use of character string areas on the next page and so forth while performing the preview display of the subsequent pages in the preview display area 810.

Next, the second round will be described. The second round will be described with reference to a document shown in FIG. 12A which is similar to the document shown in FIG. 8A, and a scanned image to be displayed in a preview display area 1210 in FIG. 12B. Specifically, new scanned image data obtained by the scan processing in the second round is assumed to be data determined as being similar to the scanned image data obtained in the past. The new scanned image data is assumed to have the size of the table and the positions of character string areas that are present in the vicinity of the table, which are different from those of the past scanned image data. Moreover, the information set to the past scanned image data is assumed to have been set based on characters in the character string areas that are present in the vicinity of the table in the past scanned image data.

Figure 11B:
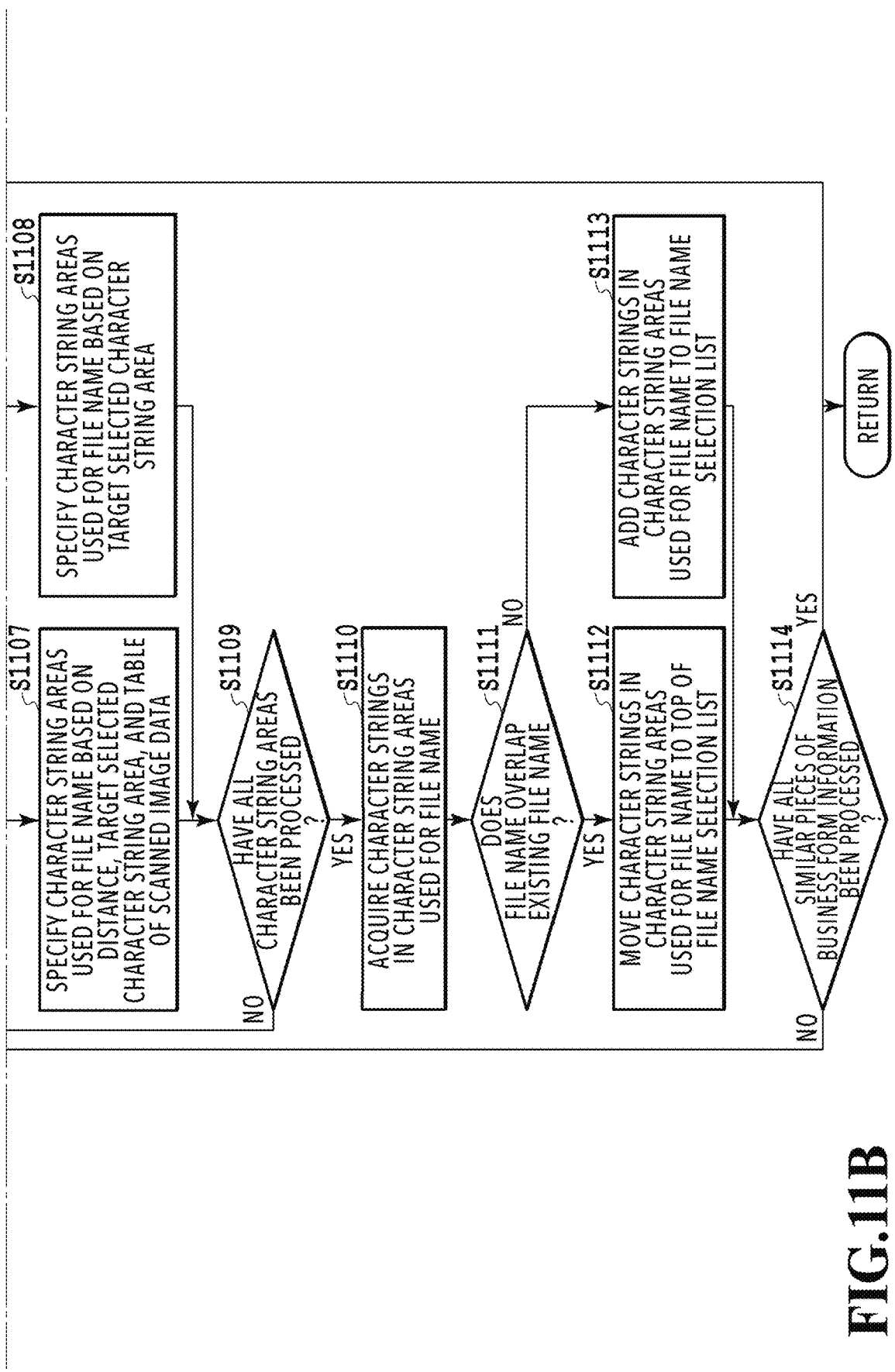

The second round is different from the first round in that the second round carries out processing from S1102 to S1114 shown in FIG. 11A and FIG. 11B and processing from S912 to S914 shown in FIG. 9. The explanations of the processing similar to that in the first round will be omitted as appropriate. Moreover, the second round is based on the premise that the scan processing and the processing from S501 to S505 and from S701 to S703 have been executed in advance. Furthermore, the business form information holding unit 427 is assumed to hold the scanned image shown in the preview display area 810 in FIG. 8B and FIG. 8C under the file name of "QUOTATION_R12-3456_Kawasaki Inc." as inputted to the file name input field 801.

Figure 12B:
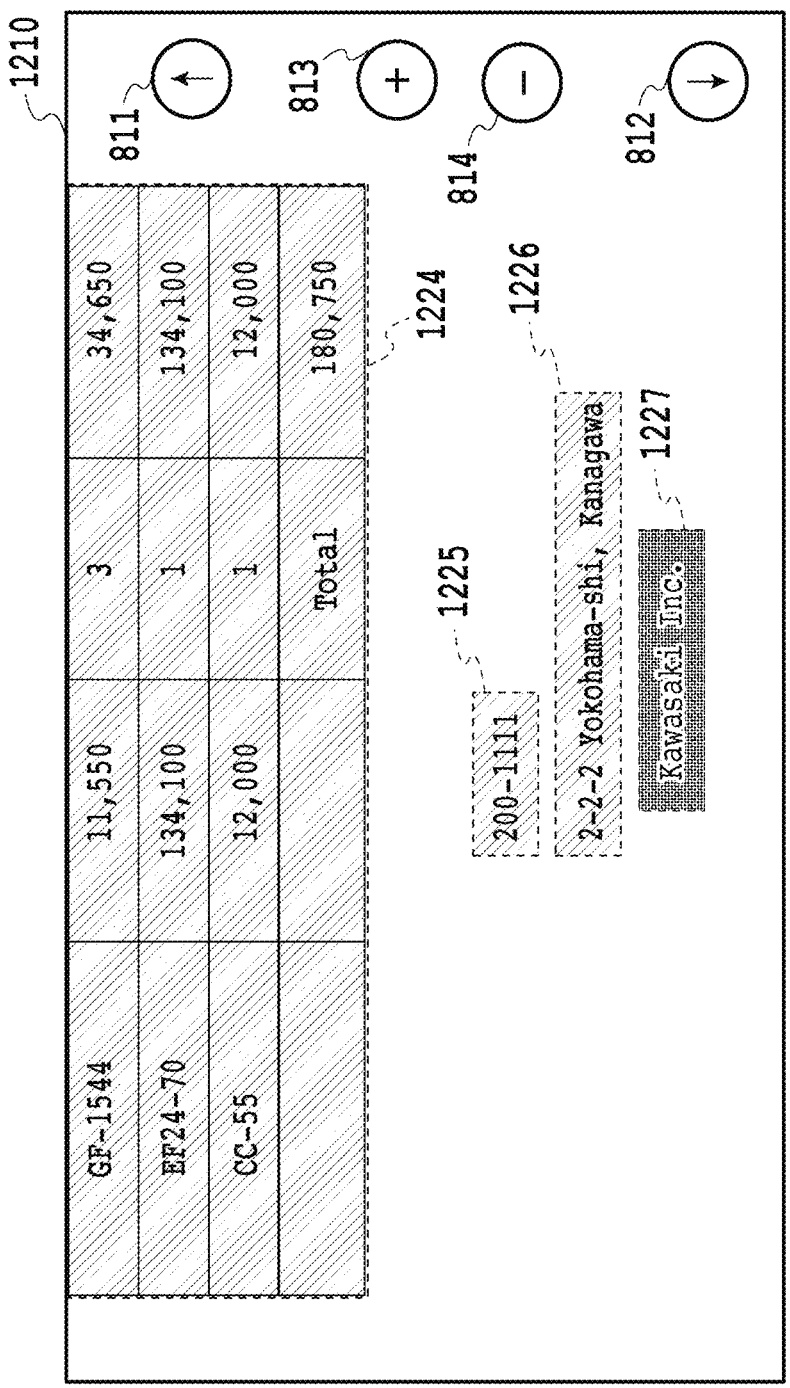

Table 5 shows an example of character string areas obtained by subjecting the document shown in FIG. 12A to the scan processing and causing the image analysis unit 423 to perform the analysis in S703 of the contents of the image data that are corrected in S702. A table indicated with number 9 corresponds to a table 1224 shown in FIG. 12B, which is larger in the direction of the height of the area due to an increased row as compared to the table obtained in the first round.

TABLE 5

| Number | Area | | | | |
|---|---|---|---|---|---|
| | X-coordinate | Y-coordinate | Width | Height | Type |
| 1 | 191 | 24 | 120 | 30 | text |
| 2 | 324 | 74 | 84 | 22 | text |
| 3 | 377 | 99 | 75 | 22 | text |
| 4 | 15 | 104 | 91 | 22 | text |
| 5 | 324 | 128 | 70 | 22 | text |
| 6 | 15 | 130 | 134 | 22 | text |
| 7 | 362 | 155 | 90 | 22 | text |
| 8 | 37 | 166 | 136 | 30 | text |

TABLE 5-continued

| Number | Area | | | | |
|---|---|---|---|---|---|
| | X-coordinate | Y-coordinate | Width | Height | Type |
| 9 | 37 | 190 | 480 | 150 | table |
| 10 | 214 | 341 | 91 | 22 | text |
| 11 | 214 | 365 | 136 | 22 | text |
| 12 | 236 | 389 | 134 | 30 | text |

In S1101, the image analysis unit 423 determines that the business form information similar to the scanned image data saved in the image data saving unit 412 is held by the business form information holding unit 427 and that there is the similar business form information. As a consequence of the determination that there is the similar business form information, the flow proceeds to S1102.

In S1102, the image analysis unit 423 specifies a target piece of the business form information out of business form information held by the business form information holding unit 427, which is similar to the scanned image data saved in the image data saving unit 412.

In S1103, the image analysis unit 423 acquires all of the selected character string areas from the target piece of the business form information specified in S1102.

In S1104, the image analysis unit 423 specifies a target selected character string area out of all of the selected character string areas acquired in S1103.

In S1105, the image analysis unit 423 determines whether or not there is a table (whether or not the table exists) above the target selected character string area specified in S1104 in terms of the coordinate system (x,y). The flow proceeds to S1106 in a case where the image analysis unit 423 determines that there is the table above the target selected character string area. On the other hand, the flow proceeds to S1108 in a case where the image analysis unit 423 determines that there is no table above the target selected character string area.

Here, procedures to determine whether or not there is the "table" above the target selected character string area in terms of the coordinate system (x,y) will be described with reference to the character string area information shown in Table 4. Since the coordinates of each area is defined on the basis of the upper left corner of the document serving as the point of origin (0, 0), a smaller numeral value is determined to represent an upper location. Now, relations among the "table" and the character string areas for "QUOTATION", "R12-3456", and "Kawasaki Inc." will be described as an example.

The character string area for "QUOTATION" corresponds to number 1 in Table 4. Regarding this area, the y-coordinate has a value of 24 while the height has a value of 30. Therefore, this area is present in the range of the position coordinates from 24 to 54 in terms of the y-coordinate. In the meantime, the "table" corresponds to number 9 in Table 4. Regarding this area, the y-coordinate has a value of 190 while the height has a value of 120. Therefore, this area is present in the range of the position coordinates from 190 to 310 in terms of the y-coordinate. In a case where the position coordinates of "QUOTATION" are compared with the position coordinates of the "table", the position coordinates of "QUOTATION" are smaller than the position coordinates of the "table". As a consequence, it is determined that number 9 (the table) is not present above number 1 (QUOTATION).

The character string area for "R12-3456" corresponds to number 3 in Table 4. Regarding this area, the y-coordinate has a value of 99 while the height has a value of 22.

Therefore, this area is present in the range of the position coordinates from 99 to 121 in terms of the y-coordinate. In a case where the position coordinates of "R12-3456" are compared with the position coordinates of the "table", the position coordinates of "R12-3456" are smaller than the position coordinates of the "table". As a consequence, it is determined that number 9 (the table) is not present above number 3 (R12-3456) as with number 1 (QUOTATION).

The character string area for "Kawasaki Inc." corresponds to number 12 in Table 4. Regarding this area, the y-coordinate has a value of 359 while the height has a value of 30. Therefore, this area is present in the range of the position coordinates from 359 to 389 in terms of the y-coordinate. In a case where the position coordinates of "Kawasaki Inc." are compared with the position coordinates of the "table", the position coordinates of number 12 (Kawasaki Inc.) are larger than the position coordinates of number 9 (the table). As a consequence, it is determined that number 9 (the table) is present above number 12 (Kawasaki Inc.). The flow proceeds to S1106 in a case where the image analysis unit 423 determines that the table is present above the selected character string area, and the image analysis unit 423 derives a distance from the table in S1106. On the other hand, the flow proceeds to S1108 in a case where the image analysis unit 423 determines that the table is not present above the selected character string areas, and the image analysis unit 423 specifies character string areas used for the file name in S1108.

In S1106, the image analysis unit 423 derives the distance between the target selected character string area and the table. In this example, the table of number 9 is present in the range from 190 to 310 in terms of the y-coordinate while the selected character string area of number 12 is present in the range from 359 to 389 in terms of the y-coordinate. Therefore, the distance between the table of number 9 and the selected character string area (Kawasaki Inc.) of number 12 turns out to be 49 (=359-310).

In S1107, the selected character string areas in the scanned image data to be used as the file name are specified based on the distance derived in S1106, the target selected character string area specified in S1104, and the table of the scanned image data. In other words, the character string areas used for the file name are specified. In this way, there is specified the selected character string area in the new scanned image data having the relation similar to or the same as the relation of the position coordinates between the table and the character string area provided with the selection information in the past scanned image data which has been determined to be similar to the new scanned image data. In this embodiment, the corresponding character string area in Table 5 is specified based on the distance between the character string areas of number 12 and number 9 in Table 4, the position coordinates of the selected character string area of number 12 in Table 4, and the character string area (the table) of number 9 in Table 5. The character string area of number 12 in Table 5, which has the same x-coordinate (236) and the same size (30) in the height direction as those of number 12 in Table 4 and is located at a position (389) at a distance (49) away from the y-coordinate 340 (=190+150) of the lower end of number 9 (the table) in Table 5, is specified as the corresponding character string area. If the character string area at the same position as the selected character string area located below the table in the similar past scanned image data is extracted from the new scanned image data without using the aforementioned distance, then the character string area of number 11 in Table 5 will correspond thereto. As a consequence, a character string not intended by the user will be extracted.

In S1108, the image analysis unit 423 specifies the corresponding character string areas in the scanned image data as the character string areas used for the file name based on the target selected character string area. Specifically, the image analysis unit 423 holds the selected character string area specified in S1104 in a storage area of the RAM 213.

In S1109, the image analysis unit 423 determines whether or not all of the selected character string areas have been processed. The flow returns to S1104 if there is an unprocessed selected character string area and the image analysis unit 423 determines that the processing of all of the selected character string areas is yet to be completed. Then, the processing from S1104 to S1108 is carried out. The flow proceeds to S1110 in a case where the image analysis unit 423 determines that all of the selected character string areas have been processed.

As a consequence of the processing up to S1109, a target area is detected based on the target piece of the business form information thus specified, the table included in the past scanned image data determined to be similar, and the table included in the new scanned image data. The target area is an area to be subjected to the processing among the character string areas extracted from the new scanned image data.

In S1110, the image analysis unit 423 performs the OCR processing on the selected character string area, which is the target area and is held in the storage area of the RAM 213, thereby acquiring the character strings in the character string areas used for the file name and generating the file name therefrom. Here, the file name is generated by acquiring the character strings in the character string areas used for the file name in the same order as that of the selection information attached to the past scanned image data.

In S1111, the image analysis unit 423 determines whether or not the file name selection list held in the storage area of the RAM 213 overlaps the file name generated in S1110. The flow proceeds to S1112 in a case where the overlap is determined by the image analysis unit 423, and the image analysis unit 423 moves the overlapping file name to the top of the file name selection list. On the other hand, the flow proceeds to S1113 in a case where the overlap is not determined by the image analysis unit 423, and the image analysis unit 423 adds the file name generated in the S1110 to the file name selection list held in the storage area of the RAM 213.

In this embodiment, the character string extracted by performing the image processing is used as a name of the folder being a storage location of the image data or as the information to be added to the file name. However, it is also possible to use the extracted character string to other purposes. For example, a telephone number corresponding to a character string may be specified to send the image data to a destination with this telephone number by facsimile, or a mail address may be specified to send the image data by mail.

Meanwhile, this embodiment has described the method of specifying a file name selection character string area based on the distance between the table and the selected character string area below the table. Here, it is also possible to adopt a method of specifying the file name selection character string area based on an amount of the character strings located between the table and the selected character string area below the table instead of using the distance.

In the meantime, this embodiment has described the case in which the file name selection character string area is located outside the table in terms of the coordinate system (x,y). In a case where the file name selection character string area is located inside the table in terms of the coordinate system (x,y), it is also possible to adopt a method of specifying the file name selection character string area based on a position of an item in the table instead of using a coordinate position.

Now, a description will be given of a difference from the first round in the flow of FIG. 9 that shows the details of the file name generation processing S508. To be more precise, a description will be given of a case of selecting a file name candidate as the file name from the file name selection list displayed as a consequence of pressing the "display file name list" button. Here, the business form information holding unit 427 is assumed to hold the business form information similar to the scanned image data obtained in the second round.

Figure 16:
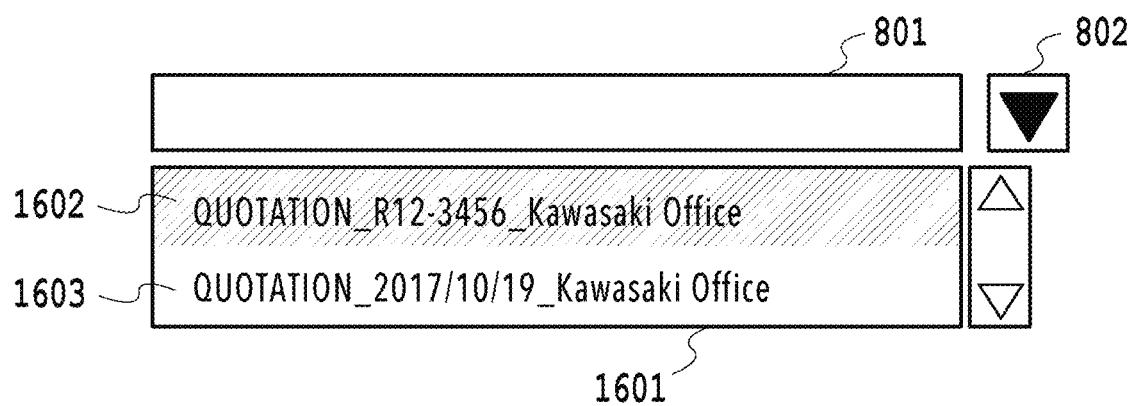
FIG. 16 is a diagram showing an example of file name list display.

In S911, the processing to follow is decided depending on the type of the pressed button. The flow proceeds to S912 in a case where the press of the "display file name list" button 802 is detected. In S912, the display control unit 426 displays the file name candidates generated based on the piece of the business form information, which is determined to be similar by the image analysis unit 423, as the file name selection list. Here, if the business form information holding unit 427 does not hold the piece of the business form information similar to the scanned image data, no file name selection list is displayed after pressing the "display file name list" button 802. The method of displaying the file name selection list includes a method of displaying a list of multiple file name candidate options in a pull-down fashion, for example. Moreover, the file name candidate of one of the files held in the business form information holding unit 427 which is most similar to the scanned image data can be moved to the top of the file name candidates displayed in the pull-down fashion and can also be highlighted. For example, as shown in FIG. 16, there is a method of displaying a file name selection list 1601 in a pull-down fashion while including an area 1602 in which the most similar target file name candidate is displayed with hatched-line decoration, and an area 1603 in which other file name candidates are displayed without decoration. Meanwhile, there is also a method of displaying only the target file name candidate in a larger font size, with bold characters, or in red text in contrast to other file name candidates.

In S913, it is determined whether or not the file name candidate is selected from the file name candidate list by the user. The flow proceeds to S914 in a case where selection of the file name candidate is detected. On the other hand, the flow is terminated in a case where selection of the file name candidate is not detected.

The character string of the file name candidate overlapping the position coordinates subjected to the touch operation is acquired in S914. Then, the flow proceeds to S910. In S910, the character string set at this moment is displayed in (automatically inputted to) the file name input field 801.

As described above, the file name candidates are generated by using the character string area information selected as the file name of the similar scanned image data out of the past scanned image data. Accordingly, it is possible to save the effort of selecting the character string on the preview screen. A document may adopt a format which does not predetermine locations of entry items but instead renders a certain entry field expandable while retaining the same format in such a way as to change locations of the entry items in accordance with the size of the expanded field. Even in the case of this document, it is possible to appropriately specify the area in this scanned image data to be subjected to the OCR processing and to reliably acquire the information in the area. As a consequence, it is possible to set the file name for the similar scanned image data easily while applying the same rule.

Second Embodiment

Figure 13B:
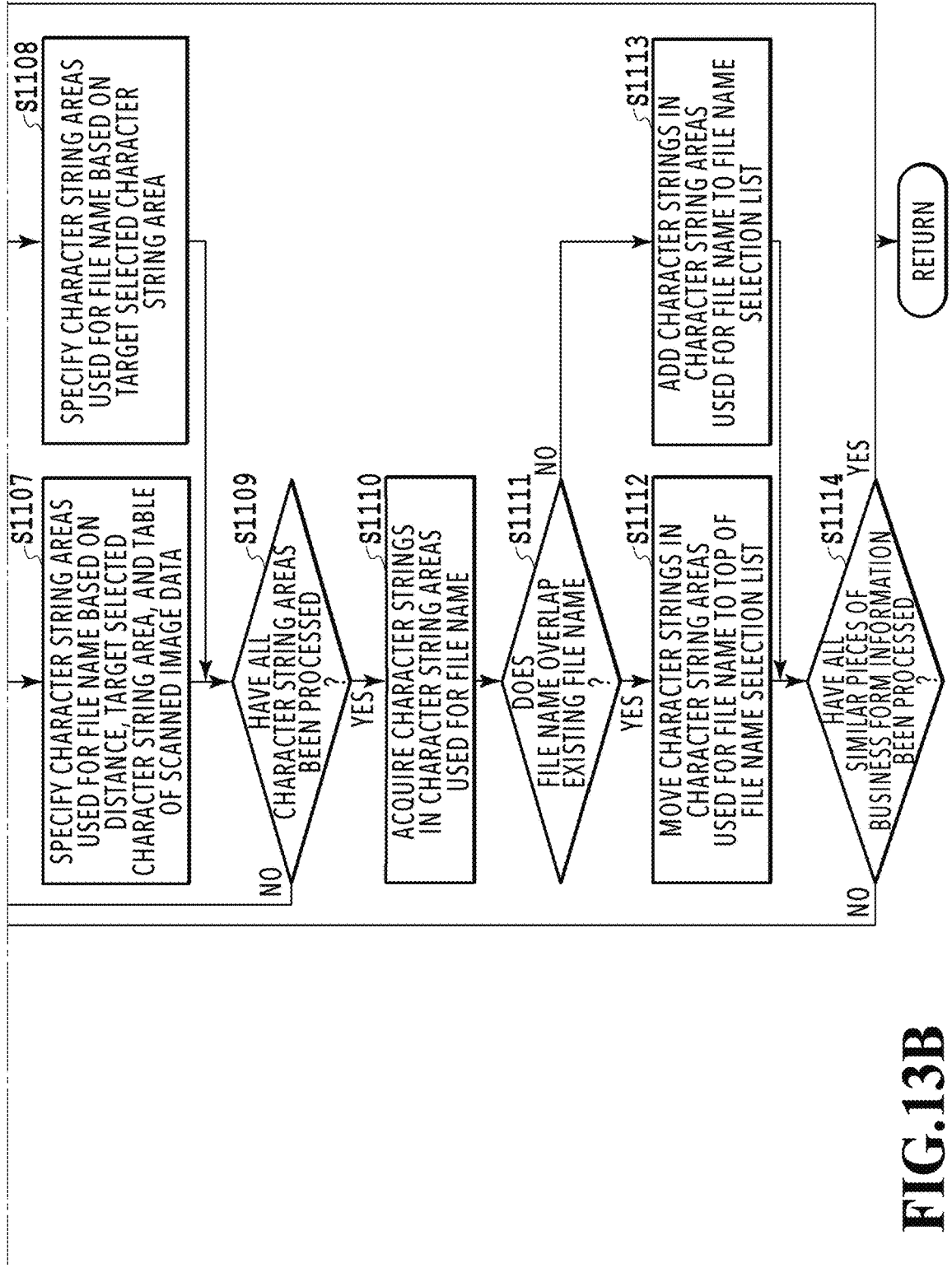
Figure 14:
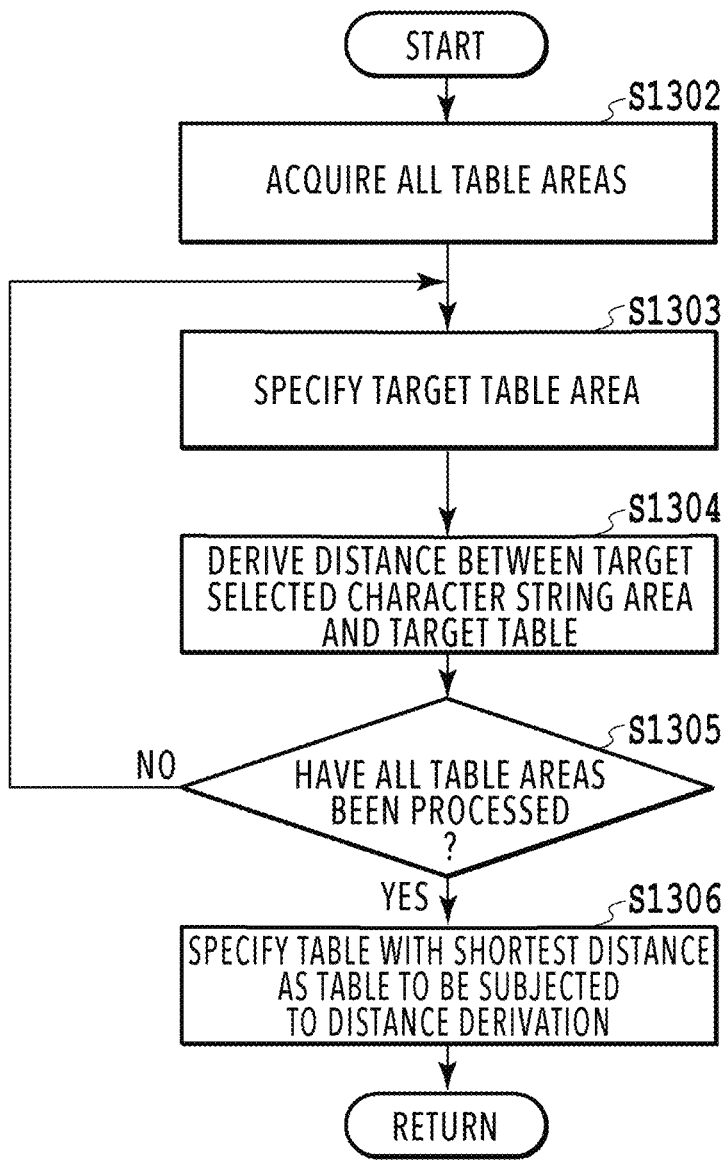
FIG. 14 is a flowchart showing details of distance derivation processing.

Next, a second embodiment of the present invention will be described. The first embodiment has described the case of processing the document including one table. In this embodiment, a description will be given of a case of processing a document including two or more tables. Differences between this embodiment and the first embodiment lie in the processing to derive the distance between the table and the character string area (S1106) and in the preview screen. Details of the processing in S1106 will be described with reference to flowcharts shown in FIG. 13A, FIG. 13B and FIG. 14. The flowcharts shown in FIG. 13A, FIG. 13B and FIG. 14 are different from the flow chart shown in FIG. 11A and FIG. 11B in that processing from S1301 to S1306 is performed in the former flowcharts. In the meantime, the preview screen of this embodiment will be described with reference to a preview screen shown in FIG. 15A and FIG. 15B. Explanations for other features that are the same as those in the first embodiment will be omitted as appropriate. In this embodiment, the business form information holding unit 427 is assumed to hold information on character string areas as shown in Table 6.

TABLE 6

| Business form number | Number | Area | | | | | Selection information | Character string in area (for reference) |
|---|---|---|---|---|---|---|---|---|
| | | X-coordinate | Y-coordinate | Width | Height | Type | | |
| 1 | 1 | 191 | 24 | 120 | 30 | text | 1 | QUOTATION |
| | 2 | 324 | 74 | 84 | 22 | text | — | Ref. No. |
| | 3 | 377 | 99 | 75 | 22 | text | 2 | R12-3456 |
| | 4 | 15 | 104 | 91 | 22 | text | — | 100-9999 |
| | 5 | 324 | 128 | 70 | 22 | text | — | Date of issue: |
| | 6 | 15 | 130 | 211 | 22 | text | — | 1-1-1 Minato-ku, Tokyo |
| | 7 | 362 | 155 | 90 | 22 | text | — | 2017 Aug. 15 |
| | 8 | 37 | 166 | 136 | 30 | text | — | Shinagawa Inc. |
| | 9 | 37 | 190 | 110 | 120 | table | — | |
| | 10 | 157 | 190 | 360 | 120 | table | — | |
| | 11 | 214 | 311 | 91 | 22 | text | — | 200-1111 |

TABLE 6-continued

| Business form number | Number | Area | | | | | Selection information | Character string in area (for reference) |
|---|---|---|---|---|---|---|---|---|
| | | X-coordinate | Y-coordinate | Width | Height | Type | | |
| | 12 | 214 | 335 | 136 | 22 | text | — | 2-2-2 Yokohama-shi, Kanagawa |
| | 13 | 236 | 359 | 134 | 30 | text | 3 | Kawasaki Inc. |

Figure 15B:
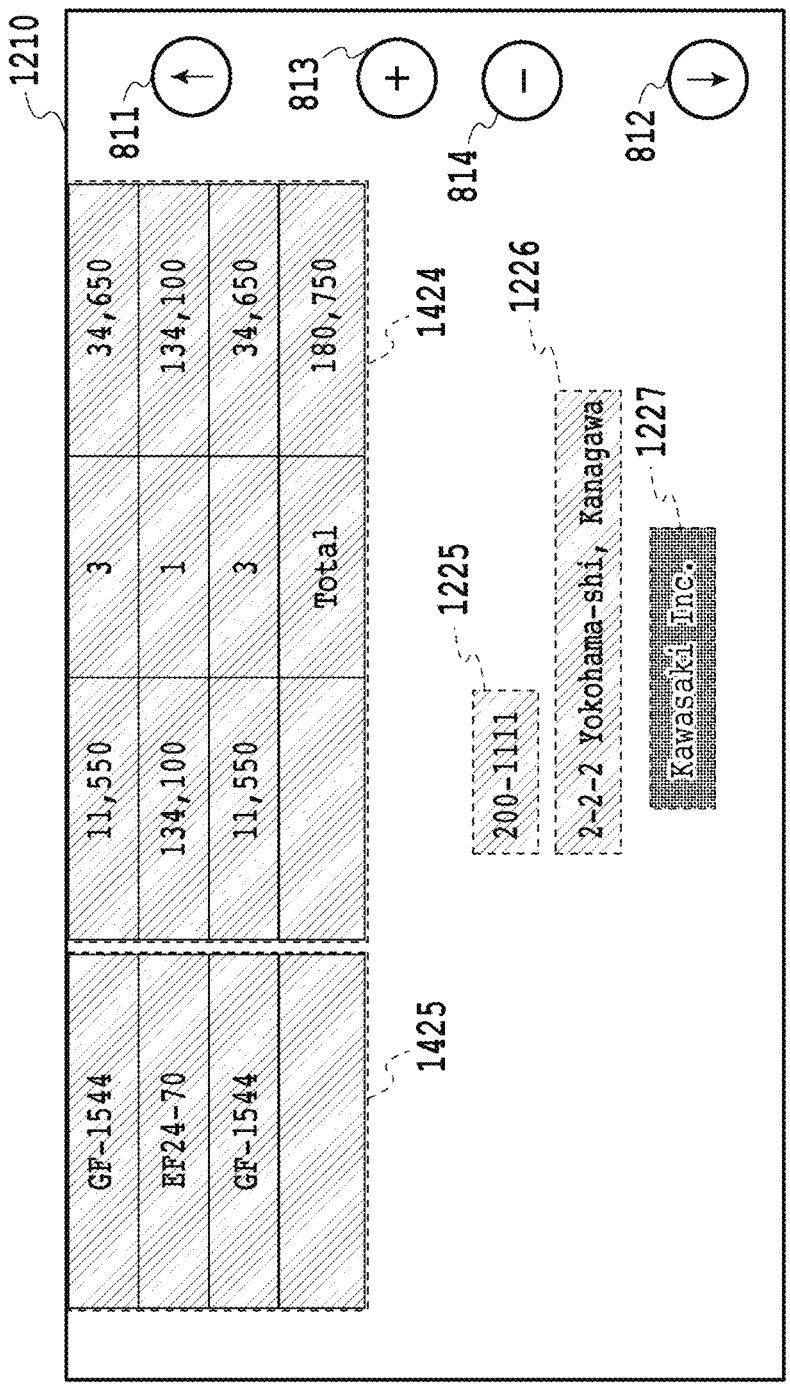

Table 7 shows an example of character string areas obtained by performing the scan processing on a document shown in FIG. 15A and causing the image analysis unit 423 in S703 to analyze the contents of the image data corrected in S702. A table indicated with number 9 corresponds to a table 1425 shown in FIG. 15B while a table indicated with number 10 corresponds to a table 1424 shown in FIG. 15B.

TABLE 7

| | Area | | | | |
|---|---|---|---|---|---|
| Number | X-coordinate | Y-coordinate | Width | Height | Type |
| 1 | 191 | 24 | 120 | 30 | text |
| 2 | 324 | 74 | 84 | 22 | text |
| 3 | 377 | 99 | 75 | 22 | text |
| 4 | 15 | 104 | 91 | 22 | text |
| 5 | 324 | 128 | 70 | 22 | text |
| 6 | 15 | 130 | 211 | 22 | text |
| 7 | 362 | 155 | 90 | 22 | text |
| 8 | 37 | 166 | 136 | 30 | text |
| 9 | 37 | 190 | 110 | 150 | table |
| 10 | 157 | 190 | 360 | 150 | table |
| 11 | 214 | 311 | 91 | 22 | text |
| 12 | 214 | 335 | 136 | 22 | text |
| 13 | 236 | 359 | 134 | 30 | text |

FIG. 14 is a flowchart showing details of distance derivation processing in S1301 in FIG. 13A. Now, a description will be given below along with a flow in FIG. 14.

In S1302, the image analysis unit 423 acquires all pieces of table area information from the target piece of the business form information. In the example shown in Table 6, the image analysis unit 423 acquires pieces of the table area information corresponding to number 9 and number 10, respectively. Each piece of the table area information contains the x-coordinate and the y-coordinate of the table area, and sizes in the width direction and the height direction of the table area. Regarding the table corresponding to number 9, the image analysis unit 423 acquires the piece of table area information having values of the x-coordinate of the area being 37 and the y-coordinate thereof being 190, and values of the sizes in the width direction thereof being 110 and in the height direction being 120, respectively. Regarding the table corresponding to number 10, the image analysis unit 423 acquires the piece of table area information having values of the x-coordinate of the area being 157 and the y-coordinate thereof being 190, and values of the sizes in the width direction thereof being 360 and in the height direction being 120, respectively.

In S1303, the image analysis unit 423 specifies one of the table areas as a target. In the example shown in Table 6, any one of the tables corresponding to number 9 and number 10 is specified.

In S1304, the image analysis unit 423 derives a distance between the target selected character string area specified in S1104 and the target table area specified in S1303. Here, a description will be given of a case where the selected character string area corresponding to number 13 is specified in S1104 and the table area corresponding to number 9 is specified in S1303. The selected character string area of number 13 is in the range from 359 to 389 in terms of the y-coordinate while the table area of number 9 is in the range from 190 to 310 in terms of the y-coordinate. Therefore, the distance in the y-axis direction turns out to be 49 (=359-310). In the meantime, concerning the x-coordinate, the selected character string area of number 13 has a value of 236 while the table area of number 9 has a value of 37. Accordingly, the distance in the x-axis direction turns out to be 199 (=236-37).

In S1305, the image analysis unit 423 determines whether or not all of the table areas in the target piece of the business form information have been processed. The flow returns to S1303 if there is an unprocessed table area and the image analysis unit 423 determines that the processing of all of the table areas is yet to be completed. Then, the processing from S1303 to S1305 is carried out. The flow proceeds to S1306 in a case where the image analysis unit 423 determines that all of the table areas have been processed.

In S1306, the image analysis unit 423 specifies the table having the shortest distance derived in S1304, namely, the table closest to the selected character string area as the table to be subjected to the distance derivation. In the example shown in Table 6, the distance between the selected character string area of number 13 and the table area of number 9 derived in S1304 is compared with the distance between the selected character string area of number 13 and the table area of number 10 derived in S1304. The distance between the selected character string area of number 13 and the table area of number 9 is expressed by 199 in the x-axis direction and 49 in the y-axis direction. On the other hand, the distance between the selected character string area of number 13 and the table area of number 10 is expressed by 79 in the x-axis direction and 49 in the y-axis direction. In a case where the distance in the case of the table of number 9 is compared with the distance in the case of the table of number 10, both of the tables have the same distance in the y-axis direction whereas the case of the table of number 10 has a shorter distance than the case of the table of number 9 in terms of the x-axis direction. Accordingly, it is not the table of number 9 but is the table of number 10 which is to be specified as the table to be subjected to the distance derivation. The table thus specified in S1306 is used for specifying the character string areas used for the file name in S1107.

As described above, even in a case where the document adopts the format that changes locations of entry items in accordance with the size of a certain entry field and the document includes two or more of such entry fields as typified by the tables as with first embodiment, it is still possible to appropriately specify the area in the scanned image data of this document to be subjected to the OCR processing and to reliably acquire the information in the area. In this way, it is possible to set the file name for the similar scanned image data easily while applying the same rule.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to this embodiment, it is possible to appropriately specify the area to be subjected to the OCR processing in the situation where the file name and the like are set by using the character strings obtained by performing the OCR processing on the scanned image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-009017, filed Jan. 23, 2018, which is hereby incorporated by reference wherein in its entirety.

What is claimed is:

1. An apparatus for setting information to scanned image data obtained by scanning a document containing a table, comprising:
   an extraction unit configured to extract character string areas each estimated as a character string and a table area estimated as a table in new scanned image data;
   a determination unit configured to determine whether or not area information of the new scanned image data is similar to area information of past scanned image data based on the extracted character string areas and the extracted table area;
   a detection unit configured to detect a target area as a processing target out of the character string areas extracted from the new scanned image data based on information of a character string area used to obtain information set to the past scanned image data whose area information are determined to be similar, information of the table included in the past scanned image data whose area information are determined to be similar, and the table included in the new scanned image data;
   a recognition unit configured to perform character recognition processing on the target area; and
   a setting unit configured to set information to the new scanned image data by using a character obtained as a result of the character recognition processing.

2. The apparatus according to claim 1, wherein
   in a case where a size of the table and a position of the character string area present in the vicinity of the table in the new scanned image data are different from a size of the table and a position of the character string area present in the vicinity of the table in the past scanned image data whose area information are determined to be similar, and in a case where the information set to the past scanned image data whose area information are determined to be similar is set based on a character string in the character string area present in the vicinity of the table in the past scanned image data whose area information are determined to be similar, the detection unit detects a particular character string area out of the character string areas present in the vicinity of the table in the new scanned image data as the target area, the particular character string area corresponding to a relation between the table in the past scanned image data whose area information are determined to be similar and the character string area used to obtain the information set to the past scanned image data.

3. The apparatus according to claim 2, further comprising:
   an acquisition unit configured to acquire position coordinates of the table and of any of the character string areas in the new scanned image data, wherein
   the detection unit detects the particular character string area out of the character string areas present in the vicinity of the table in the new scanned image data as the target area, the particular character string area corresponding to the relation between the table in the past scanned image data whose area information are determined to be similar and the character string area used to obtain the information set to the past scanned image data, based on the acquired position coordinates of the table and of the character string areas.

4. The apparatus according to claim 3, wherein
   in a case where the acquired position coordinates of one of the character string areas represent a position below a position represented by the acquired position coordinates of the table, the detection unit detects the particular character string area out of the character string areas present in the vicinity of the table in the new scanned image data as the target area, the particular character string area corresponding to the relation between the table in the past scanned image data whose area information are determined to be similar and the one character string area used to obtain the information set to the past scanned image data.

5. The apparatus according to claim 4, wherein
   the detection unit detects the particular character string area out of the character string areas present in the vicinity of the table in the new scanned image data as the target area, the particular character string area having the position coordinates with which a distance from the table in the new scanned image data becomes equal to a distance between the table in the past scanned image data whose area information are determined to be similar and the character string area used to obtain the information set to the past scanned image data.

6. The apparatus according to claim 1, further comprising:
a display control unit configured to cause a display unit to display the target area together with a scanned image originating from the new scanned image data.

7. The apparatus according to claim 6, wherein the display control unit causes the display unit to further display the information to be set to the new scanned image data.

8. The apparatus according to claim 7, wherein
in a case where there are a plurality of pieces of the information to be set to the new scanned image data, the display control unit highlights a piece of the information generated corresponding to a piece of the past scanned image data whose area information are determined to be most similar to the new scanned image data.

9. The apparatus according to claim 8, wherein the display control unit displays the piece of the information generated corresponding to the piece of the past scanned image data whose area information are determined to be most similar to the new scanned image data while moving the piece of the information onto a top of a list that displays the plurality of pieces of the information.

10. The apparatus according to claim 1, wherein
the document includes a plurality of the tables, and
the detection unit detects the target area based on one of the tables which is closest to a particular one of the character string areas located in the vicinity of the tables.

11. The apparatus according to claim 1, further comprising:
a saving unit configured to save the past scanned image data.

12. The apparatus according to claim 1, wherein
the document is a business form, and
the information is a file name to be given to the scanned image data.

13. The apparatus according to claim 1, further comprising a specification unit configured to specify the character string area which is used to obtain the information set to the past scanned image data.

14. A method of controlling an apparatus, the method comprising:
scanning a document to obtain new scanned image data;
performing image analysis of the obtained new scanned image data to extract character string areas each estimated as a character string and a table area estimated as a table in the new scanned image data;
determining whether or not area information of the new scanned image data is similar to area information of past scanned image data based on the extracted character string areas and the extracted table area;
detecting a target area as a processing target out of the character string areas extracted from the new scanned image data based on information of a character string area used to obtain information set to the past scanned image data whose area information are determined to be similar, information of the table included in the past scanned image data whose area information are determined to be similar, and the table included in the new scanned image data;
performing character recognition processing on the target area; and
setting information to the new scanned image data by using a character obtained as a result of the character recognition processing.

15. The method according to claim 14, further comprising specifying the character string area which is used to obtain the information set to the past scanned image data.

16. A non-transitory computer readable storage medium storing a program for causing a computer to perform:
extracting character string areas each estimated as a character string and a table area estimated as a table in new scanned image data by performing image analysis of the new scanned image data;
determining whether or not the area information of the new scanned image data is similar to area information of past scanned image data based on the extracted character string areas and the extracted table area;
detecting a target area as a processing target out of the character string areas extracted from the new scanned image data based on information of a character string area used to obtain information set to the past scanned image data whose area information are determined to be similar, information of the table included in the past scanned image data whose area information are determined to be similar, and the table included in the new scanned image data;
performing character recognition processing on the target area; and
setting information to the new scanned image data by using a character obtained as a result of the character recognition processing.

17. The non-transitory computer readable storage medium according to claim 16, wherein the stored program further causes the computer to perform specifying a character string area used to obtain information set to the past scanned image data.

* * * * *